(12) United States Patent  
Laengle

(10) Patent No.: US 9,027,629 B1
(45) Date of Patent: May 12, 2015

(54) DEVICE AND METHOD FOR FACILITATING THE DELIVERY OR MOVING OF OVERSIZED FURNITURE ITEMS

(71) Applicant: Judith C Laengle, Boca Raton, FL (US)

(72) Inventor: Judith C Laengle, Boca Raton, FL (US)

( * ) Notice: Subject to any disclaimer, the term of this patent is extended or adjusted under 35 U.S.C. 154(b) by 0 days.

(21) Appl. No.: 14/163,624

(22) Filed: Jan. 24, 2014

Related U.S. Application Data

(63) Continuation-in-part of application No. 13/475,450, filed on May 18, 2012, now Pat. No. 8,640,763, which is a continuation-in-part of application No. 13/211,797, filed on Aug. 17, 2011, now abandoned.

(60) Provisional application No. 61/374,598, filed on Aug. 17, 2010.

(51) Int. Cl.
*A47G 5/00* (2006.01)
*E06B 3/88* (2006.01)
*E06B 1/04* (2006.01)

(52) U.S. Cl.
CPC .... *E06B 3/88* (2013.01); *E06B 1/04* (2013.01)

(58) Field of Classification Search
USPC ................ 160/351; 52/741.3, 3, 211, 506.01
See application file for complete search history.

(56) References Cited

U.S. PATENT DOCUMENTS

| 1,719,364 | A | * | 7/1929 | Gilkey | 27/19 |
|---|---|---|---|---|---|
| 2,837,787 | A | * | 6/1958 | Wright | 52/717.01 |
| D239,688 | S | * | 4/1976 | Doman et al. | D7/698 |
| 4,372,364 | A | * | 2/1983 | Katz | 150/154 |
| 4,405,673 | A | * | 9/1983 | Fridley et al. | 428/80 |
| 4,483,380 | A | * | 11/1984 | Beran | 206/315.1 |
| 4,768,320 | A | * | 9/1988 | Weller | 52/211 |
| 5,351,733 | A | * | 10/1994 | Ullman | 150/154 |
| D359,664 | S | * | 6/1995 | Alley | D7/698 |
| 5,501,441 | A | * | 3/1996 | Kegley | 269/289 R |
| D370,602 | S | * | 6/1996 | Kegley | D7/698 |
| 5,775,045 | A | * | 7/1998 | Hill | 52/211 |
| 5,799,443 | A | * | 9/1998 | Koeniguer | 49/383 |
| 5,968,641 | A | * | 10/1999 | Lewis | 428/298.1 |
| 6,128,862 | A | * | 10/2000 | Katz | 52/2.11 |
| 6,216,396 | B1 | * | 4/2001 | Katz | 52/2.11 |
| D441,261 | S | * | 5/2001 | Stein | D7/698 |
| 6,357,187 | B1 | * | 3/2002 | Haldeman | 52/211 |
| 6,381,910 | B1 | * | 5/2002 | Katz | 52/211 |
| 6,526,708 | B1 | * | 3/2003 | Hartley et al. | 52/211 |
| 6,703,102 | B1 | * | 3/2004 | Prescott | 428/76 |
| 6,718,706 | B2 | * | 4/2004 | Katz | 52/211 |
| 6,829,863 | B2 | * | 12/2004 | Lovas | 52/211 |

(Continued)

*Primary Examiner* — Katherine Mitchell
*Assistant Examiner* — Johnnie A Shablack
(74) *Attorney, Agent, or Firm* — Allen D. Hertz, P.A.; Allen D. Hertz

(57) ABSTRACT

A method of using a portable, protective barrier for facilitating the passage of oversized articles through a span defined between two barriers. The protective barrier is fabricated of a board having a first (preferably smooth) planar surface and an opposite (preferably textured) planar surface defined by a peripheral edge. An arch is formed in the protective barrier to provide vertical support as well as pliancy during use. The arch can be formed by retention of the barrier within a forming carrier. The arched protective barrier is placed between the article being transferred through the span and at least one of the barriers. The article compresses the arched section of the protective barrier to facilitate movement of the article through the span. The article can be furniture, appliances, equipment, etc., and the barriers can be a corner, a wall, a doorjamb, a staircase, other furniture, artwork, etc.

20 Claims, 15 Drawing Sheets

(56) References Cited

U.S. PATENT DOCUMENTS

| | | | |
|---|---|---|---|
| 6,932,336 B1 * | 8/2005 | Nudo | 269/302.1 |
| 7,097,243 B2 * | 8/2006 | Verbovszky | 297/219.12 |
| 7,228,668 B2 * | 6/2007 | Gibney et al. | 52/506.01 |
| 7,398,612 B2 * | 7/2008 | Zheng | 40/603 |
| 7,523,588 B2 * | 4/2009 | Katz | 52/173.2 |
| 7,571,503 B2 * | 8/2009 | Gabriel | 5/636 |
| 7,897,225 B2 * | 3/2011 | Campbell et al. | 428/36.5 |
| 7,914,611 B2 * | 3/2011 | Vrzalik et al. | 96/11 |
| 8,640,763 B1 * | 2/2014 | Laengle et al. | 160/351 |
| 2004/0119220 A1 * | 6/2004 | Davis | 269/289 R |
| 2008/0048376 A1 * | 2/2008 | Farmer et al. | 269/289 R |
| 2010/0011641 A1 * | 1/2010 | Hill | 40/606.12 |
| 2010/0281783 A1 * | 11/2010 | Harrington | 52/2.23 |
| 2012/0222192 A1 * | 9/2012 | Carey et al. | 2/171.2 |

\* cited by examiner

DEVICE AND METHOD FOR FACILITATING THE DELIVERY OR MOVING OF OVERSIZED FURNITURE ITEMS

CROSS-REFERENCE TO RELATED APPLICATIONS

This United States Non-Provisional Application is a Continuation-In-Part, which claims priority to U.S. Non-Provisional application Ser. No. 13/475,450, filed on May 18, 2012 (scheduled to issue as U.S. Pat. No. 8,640,763 on Feb. 4, 2014), which is a Continuation-In-Part claiming priority to U.S. Non-Provisional application Ser. No. 13/211,797, filed on Aug. 17, 2011 (now abandoned), which claims priority to U.S. Provisional Patent Application Ser. No. 61/374,598, filed on Aug. 17, 2010, all of which are incorporated herein in their entireties.

FIELD OF THE INVENTION

The present invention relates generally to protective devices for use in moving furniture or other objects. More particularly, the present disclosure relates to a portable device used for facilitating the delivery or moving of oversized items, including furniture, appliances, equipment, and the like, and in parallel, protecting the object being moved and adjacent items such as walls, doorways, doorjambs, and the like from being damaged.

DESCRIPTION OF THE PRIOR ART

Moving household furniture or appliances from one location to another or into storage is a burdensome task that often requires the assistance of others or hiring a moving company. Office buildings typically hire moving companies to move office equipment from one office building to another. Moving companies generally employ trained and skilled individuals and provide the necessary equipment for effectively and safely moving, loading, and unloading articles from one location to a desired destination. The furniture typically passes through doorways, hallways, into and out of elevators, and the like during the moving process. Throughout the moving process, the exposed surfaces, edges and corners of the articles being moved (such as furniture, appliances, office equipment, and the like) can inadvertently come in contact with structural features such as walls, doors, doorjambs, and the like causing damage to either or both of the articles being moved and the adjacent structural features which may inadvertently contact the subject articles. Articles being moved have a tendency to frictionally engage with walls, doors, doorjambs, and the like, whereby the contact can cause damage to article being moved, wall paper, scratch painted walls, leave dents or score marks in the walls, or cause other undesirable damage thereof. In addition, moving equipment, such as dollies, or hand trucks, also poses a risk of damage to the structural features, as their metal frames or wheels often bang or rub against them.

In an effort to reduce the risk of damage, individuals and moving companies utilize a number of different devices to protect the articles being moved and structural features that may contact such articles during the transportation process to avoid damage to either object. For example, it is typically common practice for moving companies to use padded or quilted blankets that are wrapped around the article being moved to protect the article from damage. Such conventional quilted blankets are generally satisfactory for protecting furniture from damage during transport or storage but offer limited protection to structural features as the articles pass therethough. The blankets fail to protect against dents, breakage, scoring, and other damage to the structural features, as they are not intended to absorb impact. If the blankets are not securely attached to the furniture, they often slip off the furniture exposing the furniture to possible damage. Placing the quilted blankets on furniture is also time consuming, and requires a number of straps to adequately secure the blankets in place. In addition, a large number of quilted pads are often needed for larger moves. The blankets are very heavy and cumbersome, increasing the volume when passing through a tight space. The blankets can become dislodged introducing a potential risk for injury to the mover.

Other forms of protective devices are also known. One such example is the use of corrugated cardboard that is displaced about a room to protect walls, and doorjambs. Another is the use of padded coverings that are placed about legs, feet, or tops of tables. These are all placed about the article being moved.

Other embodiments are located about the structural features, such as removable and reusable guards that are secured to doorjambs using a variety of different fasteners to secure the guards in place and protective shields placed on walls to protect the wall from damage. To protect flooring, skid pads can be placed under the feet of furniture enabling the mover to slide the furniture on the floor and avoid incurring any damage.

Another protection solution utilizes barrier-type protection such as hanging padded curtains for use inside elevators and along stairways Hanging mats are often secured along the inner walls of elevators to provide protection to the interior panels of the elevators.

Door protectors, dimensioned to correspond to the height and width of a door, are also used to protect main entrance doors from damage due to contact with moving furniture. Such door protectors are securely hung on doors or removably attached to doors using a variety of fasteners.

Although the conventional prior art devices provide some protection to furniture, walls and doorjambs from damage when moving furniture, such devices have certain drawbacks. For example, many prior art devices are cumbersome and time consuming to install or fasten as many require a number of straps or fasteners to secure the protective barrier in place. Many conventional devices serve a single purpose such as being designed to protect only a doorjamb, or door or provide protection for a wall. Another drawback of conventional devices is that most devices are permanently installed in one location and fail to provide a portable, protection barrier that can be used from place to place when moving articles in and out of a room, house or building. Padded covers are bulky to use, and often tear over time. Movers' typically don't take the time to adequately strategize a damage prevention plan before moving furniture, and thus, the move is frequently initiated without properly protecting the furniture, walls, doors or doorjambs beforehand.

What is desired is a portable, protection device that is quick and easy to use, and beneficial for facilitating moving any of a variety of different articles such as furniture, equipment, appliances, and the like, while protecting the articles being moved as well as any structural features which may contact the articles being moved such as furniture, walls, doorjambs, and the like from being damaged.

SUMMARY OF THE INVENTION

Accordingly, it is a primary object of the present invention to provide a portable device that is lightweight, and easy to use for facilitating the moving of oversized articles, such as furniture, appliances, office equipment, and the like, that facilitates the move and prevents damage to the articles being moved as they pass through or by structural features or other objects. Examples of structural features can include walls, doorways, doorjambs, stairways, staircase railings, built in units, cabinets, corners, and the like. Other objects that may impact or become damaged during the moving process include furniture, art, and the like.

In another aspect of the present invention there is provided a portable, protective device for facilitating the delivery or moving of oversized articles. The portable device is preferably fabricated of a rectangular flexible board comprising a handle and having at least one side with a smooth, slippery texture. The portable device is placed between the article being moved and a structural feature which the article will pass by during a move for protecting both, the article being moved and the structural feature from damage. The smooth, slippery surface allows the furniture to slide across the surface of the board with ease. It is further recognized that the portable, protective device enables the moving parties to compress the article being moved against the portable, protective device to aid in the passage of the article through any tight spans such as a doorway, a walkway, and the like. This feature is particularly beneficial for articles such as upholstered furniture.

In yet another aspect of the invention there is provided a method of protecting furniture items, walls, doors and doorjambs during delivery and moving of the furniture items, the method comprising the steps of obtaining a portable protective barrier comprising: a board having rounded corners and two opposite surfaces, at least one of the surfaces having a smooth, slippery texture; a handle formed proximate one edge of the board, the handle defined by a full depth cut out; grasping the handle of the protective barrier with one hand, and positioning the portable protective barrier between the furniture items and a wall, doorjamb, or a door to protect the furniture items, the wall, doorjamb and door from damage.

In yet another aspect, the portable protective barrier is placed into an arch-forming carrier, such as a bag, which retains the portable protective barrier in an arched configuration. The portable protective barrier utilizes the memory of the material to retain the arched shaped resulting from storage within the arch-forming carrier. The arch-forming carrier can be a soft-sided bag, a rigid sided carrier, a soft-sided bag comprising a semi-rigid or rigid support member, and the like.

In yet another aspect, the arch-forming carrier can be preshaped to receive the portable protective barrier vertically when the portable protective barrier is formed having an arch about a vertical axis. The arched section of the arch-forming carrier is located along a side perpendicular to an opening thereof. The arch is preferably centrally located along the portable protective barrier. The arched section is located parallel to a side of the arch-forming carrier.

In yet another aspect, the arch-forming carrier can be designed to receive the portable protective barrier in a planar configuration, and subsequently the arch-forming carrier is bent about a central axis to form the desired arch. The arch-forming carrier is retained in a curved configuration by securing a first end and a second, opposite end to one another using any suitable retention member, such as straps comprising sections of a dense hook and loop tape joining material. The arch is preferably centrally located along the portable protective barrier. The arch can be formed parallel to either a longitudinal axis or a lateral axis.

In yet another aspect, the arch-forming carrier can be preshaped to receive the portable protective barrier vertically when the portable protective barrier is formed having an arch about a horizontal axis. The arched section of the arch-forming carrier is located along a side opposite of an opening thereof. The opening can remain open or comprise a closure, such as a flap, door panel, and the like. The closure can be secured using any suitable closure mechanism, including a zipper, dense hook and loop tape, frog closures, buttons and button holes, ties, snaps, a series of hooks and loops, and the like.

In yet another aspect, the arch-forming carrier can include one or more handles for ease of use. The handles can be permanently attached to a panel of the arch-forming carrier or removably attached to the arch-forming carrier. The removably attached version enables adaptive configuration to optimize the handle location and configuration for use. The handle can include a keyhole styled aperture for receiving a button for removable attached to the arch-forming carrier structure. The handle can be attached using any suitable removable attachment connector.

In yet another aspect, the handle can be adjustable.

In yet another aspect, at least a portion of the panels used for fabricating the arch-forming carrier can be of a flexible material. One or more semi-rigid or rigid panels can be inserted within the arch-forming carrier to provide additional support to the shape of the arch-forming carrier.

In yet another aspect, at least a portion of the panels used for fabricating the arch-forming carrier can be of a semi-rigid material.

In yet another aspect, at least a portion of the panels used for fabricating the arch-forming carrier can be of a rigid material.

These and other advantages of the invention will be further understood and appreciated by those skilled in the art by reference to the following written specifications, claims, and appended drawings.

BRIEF DESCRIPTION OF THE DRAWINGS

The invention will now be described, by way of example, with reference to the accompanying drawings, in which.

DETAILED DESCRIPTION OF REPRESENTATIVE EMBODIMENTS

Figure 1:
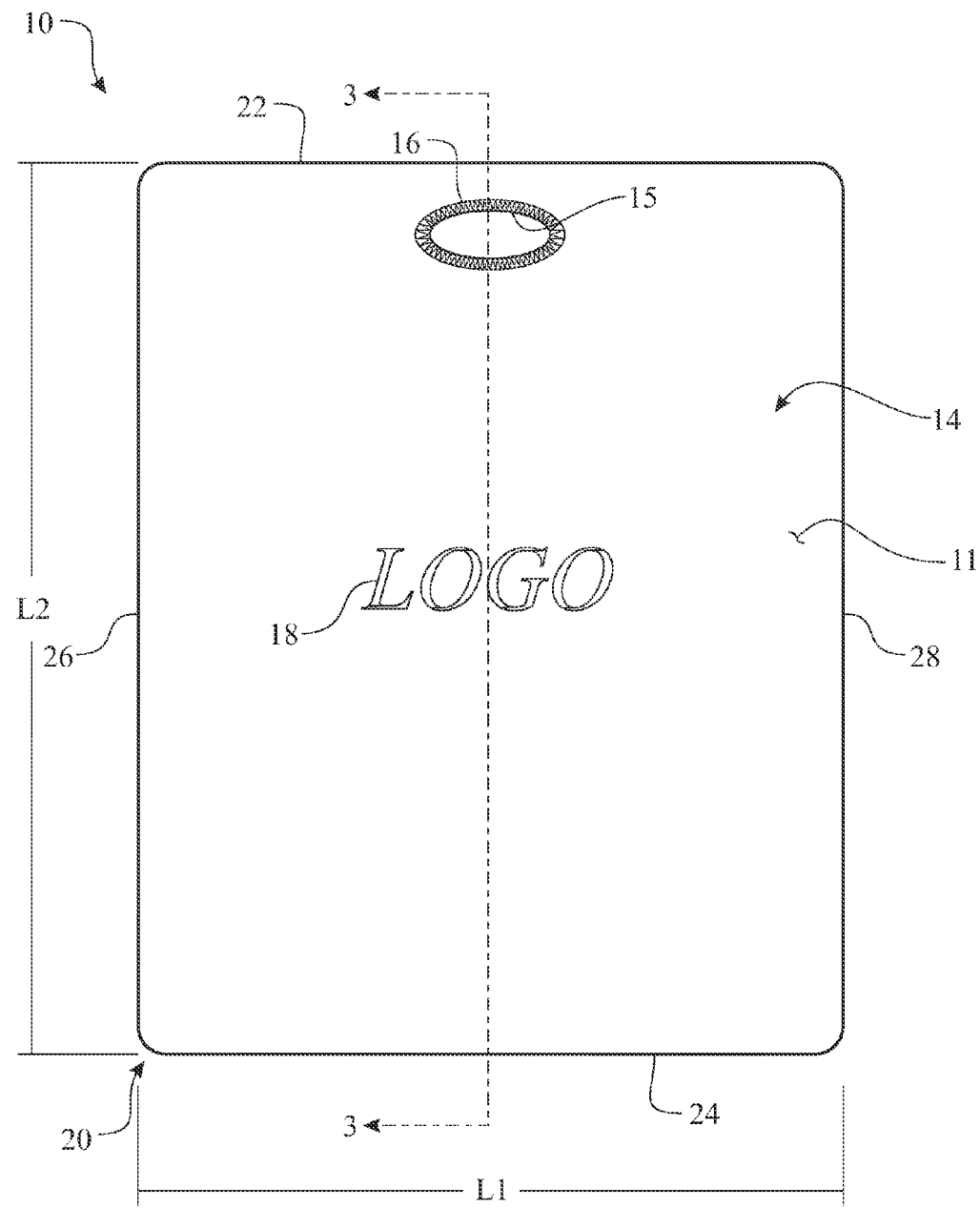
FIG. 1 presents a front plan view of a portable, protection device used for facilitating moving and preventing damage to articles such as furniture, appliances, office equipment and the like during the moving process.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to the figures wherein like numerals represent like elements throughout. An exemplary portable, protective barrier 10 is introduced in FIGS. 1 and 2, wherein a front view is presented in FIG. 1 and a side view is presented in FIG. 2. The portable, protective barrier 10 is provided for facilitating moving of articles, such as furniture, appliances, office equipment, and the like, through tight spans, such as doorways, doorjambs, stairways, and the like. The portable, protective barrier 10 provides two key benefits to the mover, the first being protection of both the article being moved and any object or structural feature that the article passes by, the second being the facilitation of passing the article through a tight span. The mover can compress the article against the object, sliding the article against the portable, protective barrier 10 to optimize the use of the distance between the span. Additionally, when the article can be compressed, such as when moving a couch or sofa, the portable, protective barrier 10 enables the movers to effectively gain additional clearance from the opposite or unprotected edge of the span. The term compress can be broadened to include positioning the article against the portable protection barrier 10 to optimize clearance between the article and the opposite surface defining the span.

In the preferred embodiment of the present invention, the portable protection barrier 10 comprises a flexible, or semi-flexible, rectangular board 14 having a handle 15. The rectangular board 14 is fabricated of a generally planar, solid material bound by a board peripheral edge 20. The board peripheral edge 20 includes a first grip edge 22, a second grip edge 24 located opposite the first grip edge 22, a first elongated edge 26 spanning between a first end of the first grip edge 22 and second grip edge 24 and a second elongated edge 28 located opposite the first elongated edge 26 and spanning between a second end of the first grip edge 22 and second grip edge 24. It is understood that the definition and number of sides 22, 24, 26, 28 may differ based upon the shape of the board peripheral edge 20. A width of the rectangular board 14, or length of sides 22, 24, is referenced by dimension "L1". A length of the rectangular board 14, or length of sides 26, 28, is referenced by dimension "L2". The peripheral edge has a thickness referenced by dimension "T". A first primary surface is referred to as a first side surface 11. The first side surface 11 spans across a continuous first edge of the peripheral edge 20. A second primary surface is referred to as a second side surface 12. The second side surface 12 spans across a continuous second edge of the peripheral edge 20. The second side surface 12 is oriented parallel to and opposite of the first side surface 11.

Figure 2:
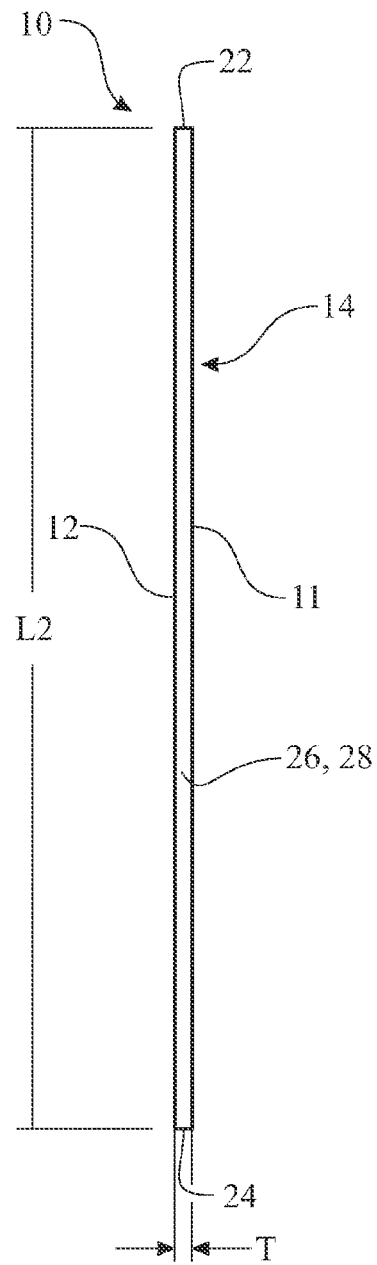
FIG. 2 presents a side view of the portable protection device originally introduced in FIG. 1.
Figure 3:
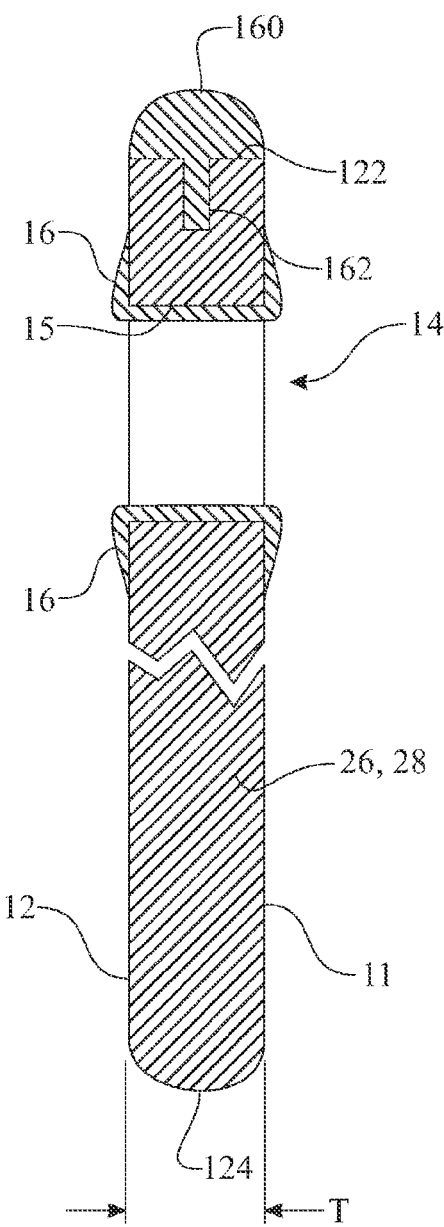
FIG. 3 presents an enlarged, sectioned side view of the portable protection device originally introduced in FIG. 1, introducing various optional end configurations, the section being taken along section line 3-3 of FIG. 1.

The rectangular board 14 may be fabricated of a laminated material, a molded material, an extruded material, or any other reasonable material to form a generally, rectangular board 14. Examples of materials that can be used to fabricate the board 14 include any one of a polymer material, plastic, fiberglass, polyvinyl chloride (PVC), a rigid rubber, a thick vinyl, thermoplastic, thermosetting plastic, polypropylene, polytetrafluoroethylene, polycarbonate, Perspex, Plexiglas or any other hard-impact resistant plastic having high tensile strength. It is preferred that the portable protective barrier 10 is fabricated of a recycled plastic, such as Polyethylene Terephthalate, High Density Polyethylene, and the like. The recycling process can introduce a dye to provide a more consistent color. Other materials which can be used include wood, composites such as fiberglass, Kevlar®, carbon fiber, and the like. The peripheral edge 20 of the rectangular board 14 is preferably shaped by rounding or chamfering the corners as illustrated in FIGS. 1 and 3. An edging finish 160 may be applied to and circumscribing the peripheral edge 20 of the rectangular board 14 to provide additional protection. The edging finish 160 may be fabricated of a plastic, rubber, or other protective or complaint material. The edging finish 160 can be attached to the rectangular board 14 using a tongue and slot interface 162, or any other reasonable attachment design. Alternatively, the peripheral edge 20 of the rectangular board 14 can be shaped in any reasonable geometry, as best illustrated by the exemplary shaped edge 124. The exemplary shaped edge 124 can be formed by a pair of round over bits, a beading bit, and the like. It is understood that the shaped edge 124 can be any reasonable cross-sectioned shape, including chamfered, scalloped, ogee, and the like.

Figure 5:
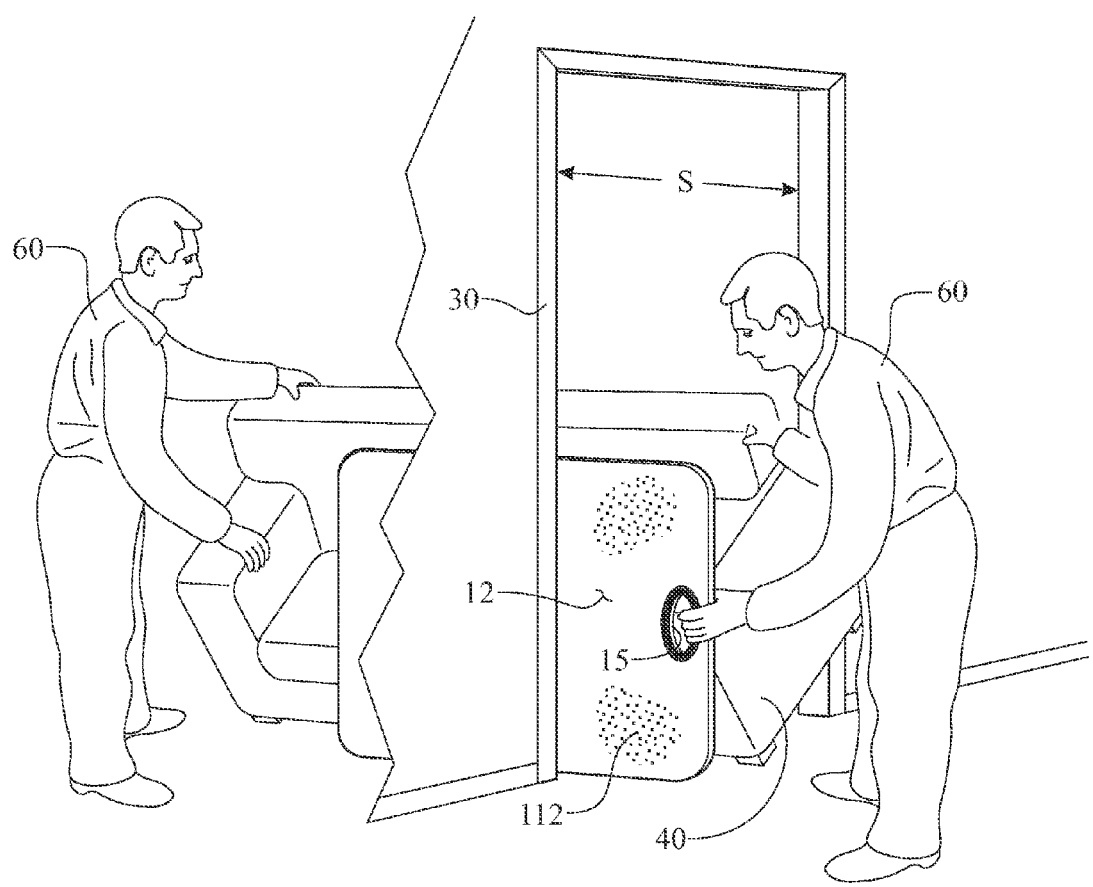
FIG. 5 presents a perspective view illustrating an exemplary application of the portable protection device for facilitating the delivery or moving of an oversized article, wherein the portable protection device is inserted between a doorjamb and a sofa to prevent damage to both items.
Figure 6:
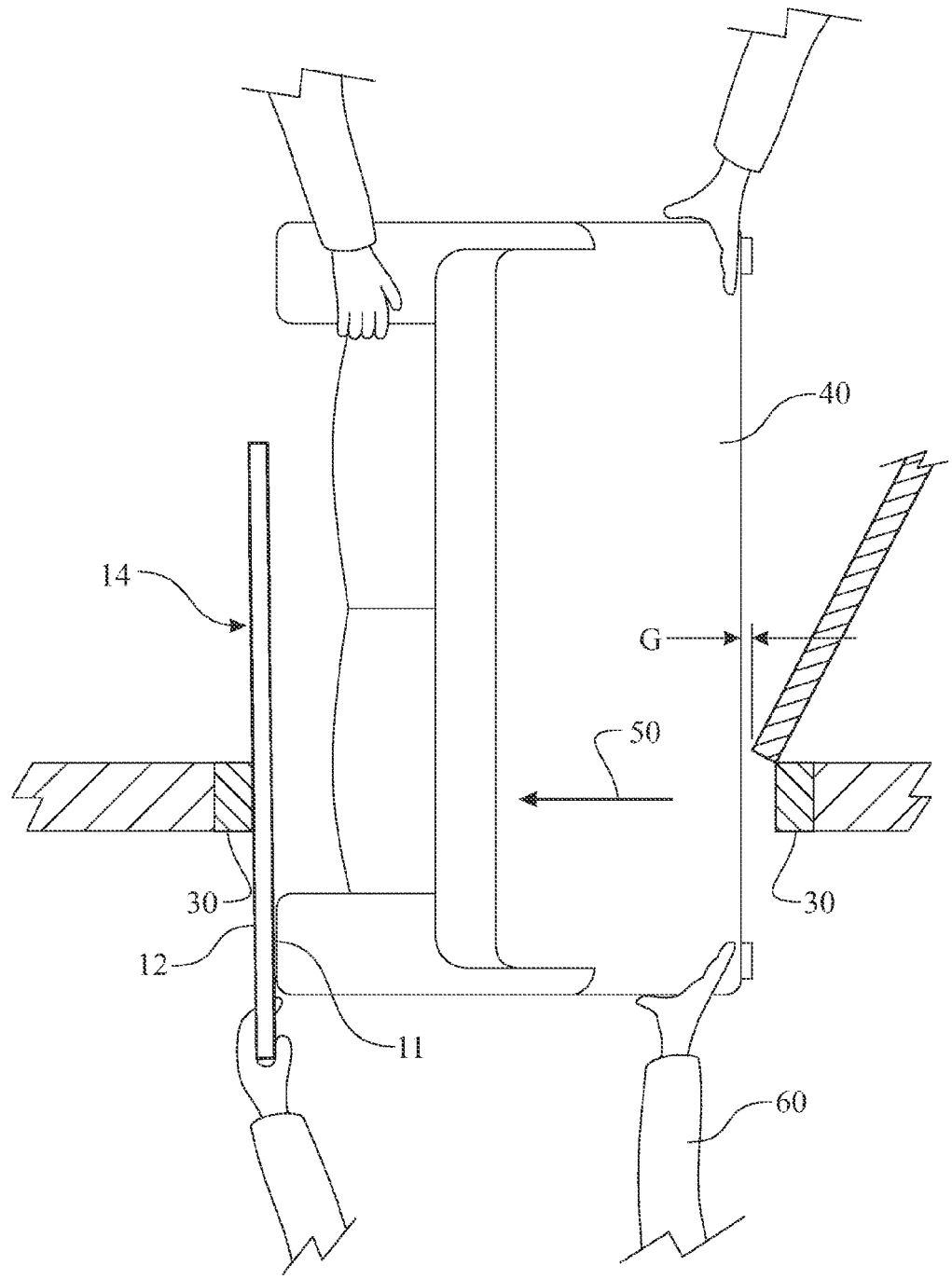
FIG. 6 presents a top view of the exemplary application of the portable protection device, originally presented in FIG. 5, introducing a compression force to aid in the passage of the article through any tight spans.

The portable protective barrier 10 includes a handle, denoted by reference number 15 in FIG. 1, for transporting the portable protective barrier 10 by hand from place to place, and for physically positioning the portable protective barrier 10 during use, as better illustrated in FIGS. 5 and 6. The handle 15 is created by forming a full depth cut completely through the board 14 as illustrated in FIG. 3. The handle 15 is located adjacent to a first edge of the board 14. An optional reinforcement material 16 may be disposed about the circumference or perimeter of the cut out to provide additional comfort to the user when gripping the handle 15. The reinforcement material 16 may be fabricated of any reasonable material, such as plastic, rubber, metal, fabric, leather, and the like. The reinforcement material 16 may also include a foam material to cushion a user's grip when holding the portable protective barrier 10.

Figure 4:
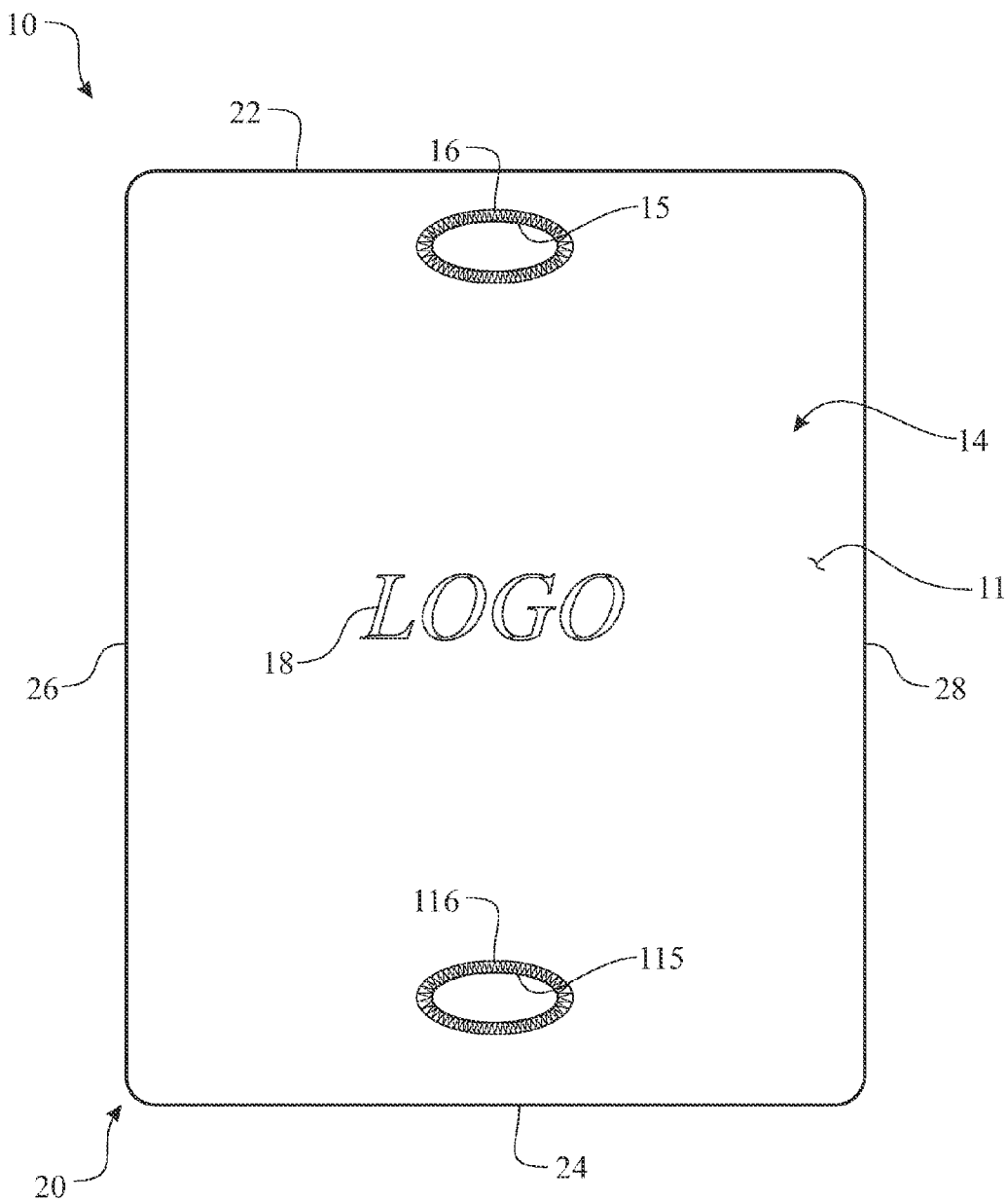
FIG. 4 presents a front plan view of the portable protection device originally introduced in FIG. 1, the portable, protection device introducing a pair of handles.

Although the handle 15 is shown to have an oval shape, it may be formed having any reasonable geometric shape. For example, handle 15 may be round, rectangular, or elliptical. The handle 15 is preferable sized and located to best suit handling during use. In one alternative embodiment, portable protective barrier 10 may include a second handle 115 (shown in FIG. 4) formed by a second full depth cut out through the board 14, where the second handle 115 is aligned with the first handle 15, but situated adjacent a second edge of board 14. The second handle 115 can optionally include a second reinforcement material 116 as previously described herein. The two handles 15, 115 provide a combinational benefit of allowing multiple movers, each standing on an opposite side of a doorway, the option of maneuvering the portable protective barrier 10 between the article being moved and a doorjamb 30, as better illustrated in FIG. 5.

The board 14 can be fabricated having any reasonable dimensions. Examples of preferred sizes include a length of 24, 36, 48, or 52 inches and a width of 24, 36, 48 or 52 inches. The length and width of the board 14 can be the same or different. The board is preferably of a thickness allowing flexure during use and would be based upon the material selected for fabrication while taking weight into consideration. It should be noted that the specified dimensions provided herein are for illustrative purposes only, and the function or practice of the present invention is not limited by any specific dimension.

The portable protective barrier 10 may be fabricated of any known geometrical shape including a square, oval, round, triangular, hexagonal, trapezoidal, scalloped or any other reasonable shape. The portable protective barrier 10 can also be fabricated of any freeform shape. The freeform shape allows the designer to integrate the handles 15, 115 into the shape of the peripheral edge 20, if so desired.

Indicia 18, advertising, markings, corporate logos, or any other indicia may be disposed anywhere on the outer surface of the board 14. For example, moving companies or packaging companies may wish to promote their products and services by placing advertisements on the outer surface of the board 14. Similarly, furniture manufactures may have a desire to promote their company as such.

The portable protective barrier 10 includes a durable board 14 having two opposite side surface 11, 12. At least one of the side surface 11, 12 is fabricated having a smooth, slippery finish. The smooth, slippery finish may be formed while fabricating the board 14, or alternatively, a slippery, smooth finish may be achieved by adhering or laminating one or more sheets to one or both of the surface of sides 11, 12 of the board 14. The sheets may comprise a thin plastic, polyethylene, polystyrene, vinyl material, and the like. The material may be heat bonded, adhesively bonded, or laminated to the sides 11, 12. Alternatively, paint, epoxy, resins, or other material may be applied to the surface of the sides 11, 12 to create the desired smooth finish. As a result of the smooth, slippery surfaces, when the furniture 40 frictionally engages either of the sides 11, 12 of the portable, protective barrier 10, the furniture simply slides across the sides 11, 12 with ease, allowing the movers' to efficiently move the furniture 40 through a tight span such as a doorway 30.

In an alternative embodiment, the portable, protective barrier 10 may include a board 14 having one side surface 11, 12 that includes a non-skid texture 112 (FIG. 5) where the non-skid texture 112 helps to hold the portable, protective barrier 10 in place during use to prevent the portable, protective barrier 10 from shifting out of place or sliding as furniture 40 frictionally engages with the portable, protective barrier 10 and slides along in a generally longitudinal direction. The non-skid textured surface 112 may be formed by placing foam, rubber, grit, or any other frictional material onto the desired surface 12 of the board 14. The non-skid texture 112 may be applied as a sheet, a series of small dimples, ridges, a spray, or any other reasonable format thereof.

Turning now to FIGS. 5 and 6, there are shown a perspective view and top view on a method of using the portable, protective barrier 10, in accordance with one embodiment of the present invention.

The portable, protective barrier 10 is generally used for enhancing movement and protecting an article being moved when the article passes through a span, such as a piece of furniture 40 passing through a doorjamb 30, as illustrated in FIGS. 5 and 6. The furniture 40 is exemplary for any article being moved. The doorjamb 30 is exemplary for any structural feature or other item forming a span referenced by "S". In use, an individual 60 grasps the portable, protective barrier 10 in one hand, by gripping handle 15, and places the portable, protective device 10 between one edge of the doorjamb 30 of a doorway and the furniture 40 forming a barrier therebetween. The portable, protective barrier 10 is positioned such that one side 11 of the portable, protective barrier 10 faces the furniture 40 and the second, opposite side 12 of the portable, protective barrier 10 faces the doorjamb 30, as better illustrated in FIG. 5. The pressure exerted on the portable, protective barrier 10 by furniture 40 causes the portable, protective barrier 10 to remain in place while the furniture 40 slides across the slippery surface of side surface 11, thus easily passing through the doorway. The portable, protective barrier 10 creates a barrier between the doorjamb 30 and the furniture 40 protecting the doorjamb 30 and furniture 40 from any damage. In the absence of the portable protective barrier 10, the furniture 40 would rub directly against the doorjamb 30 possibly causing tears, snags, scuffs, or leaving score marks, or dents in the furniture 40 or doorjamb 30. Also without the benefit of the board's 14 slippery surface, it makes moving furniture 40 through doorways more difficult. It is also recognized that multiple portable, protective devices, 10 may be used if necessary during the move. For example, two protective devices 10 may be implemented, where one portable, protective barrier 10 is placed between the furniture 40 and a left doorjamb 30, and another portable, protective barrier 10 is placed between the furniture 40 and a right doorjamb 30, where one person 60 can operatively position a first portable, protective barrier 10 in place, and a second individual 60 can operatively situate a second portable, protective barrier 10 in place. In this scenario, the furniture 40 and the doorjamb 30 are each protected on both sides.

The portable, protective barrier 10 provides an additional benefit, wherein the portable, protective barrier 10 enables the mover to apply a compression force 50 to the article (such as the furniture 40). The compression force 50 positions the article 40 against the portable, protective barrier 10 optimizing the space formed between the article 40 and the opposite side of the spanned opening. Additionally, when moving objects such as furniture 40, the compression force compacts the furniture 40, thus additionally increasing the gap (referenced as "G" in FIG. 6) on the opposite side. The present invention offers a portable protective barrier 10 that is quickly and easily inserted between furniture and structural elements such as doors, doorways, doorjambs, and walls, to prevent damage when moving the furniture. The portable, protective barrier 10 is lightweight, easy to transport and carry, and can be constructed from recyclable plastic.

Although the disclosure presents retaining the portable protective barrier 10 in position by gripping the handle 15, 115, it is understood that a retention feature or element may be utilized for temporarily securing or retaining the portable protective barrier 10 in location while passing articles nearby.

Figure 7:
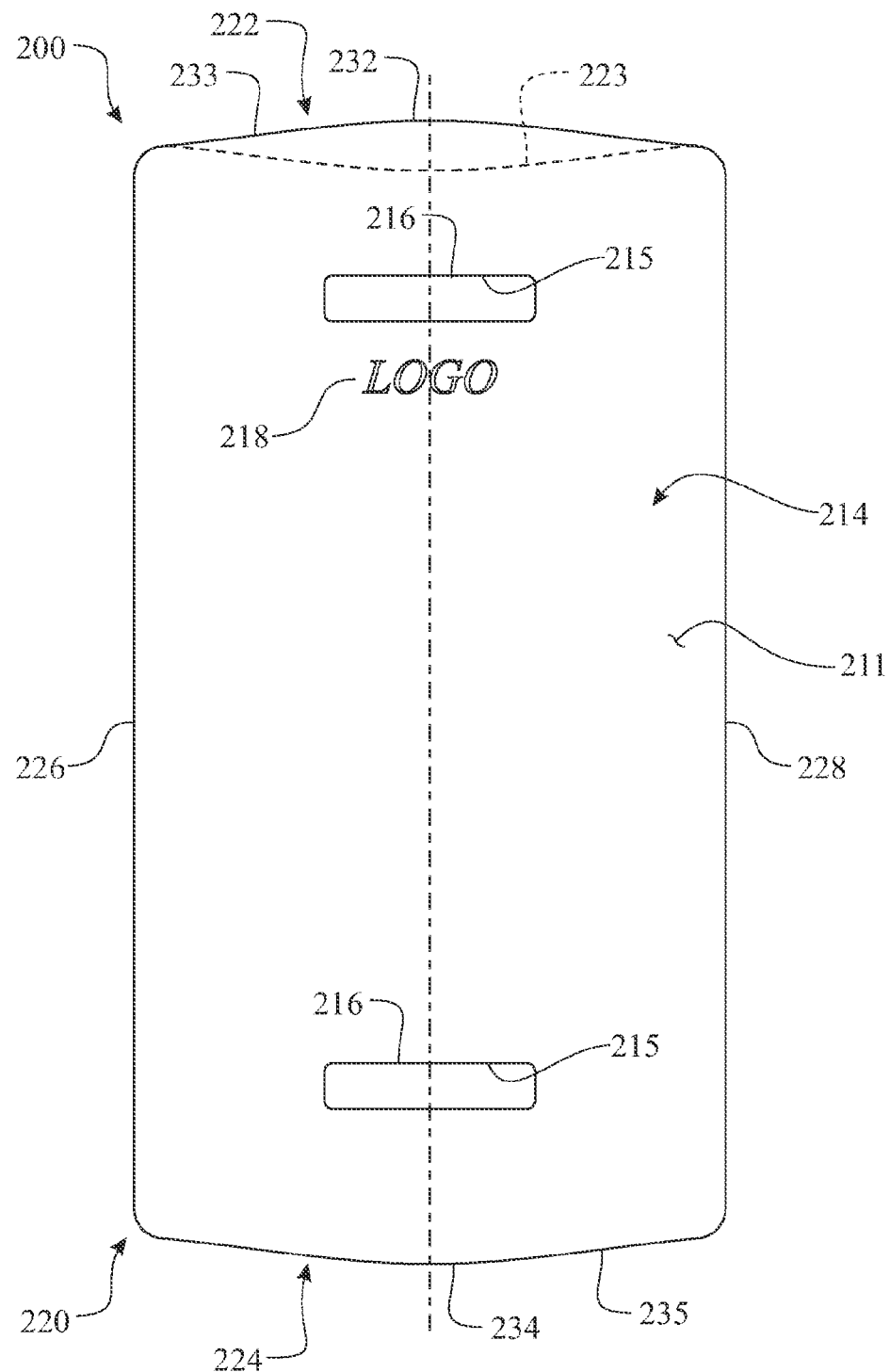
FIG. 7 presents a front elevation view of a second exemplary portable protection device.
Figure 8:
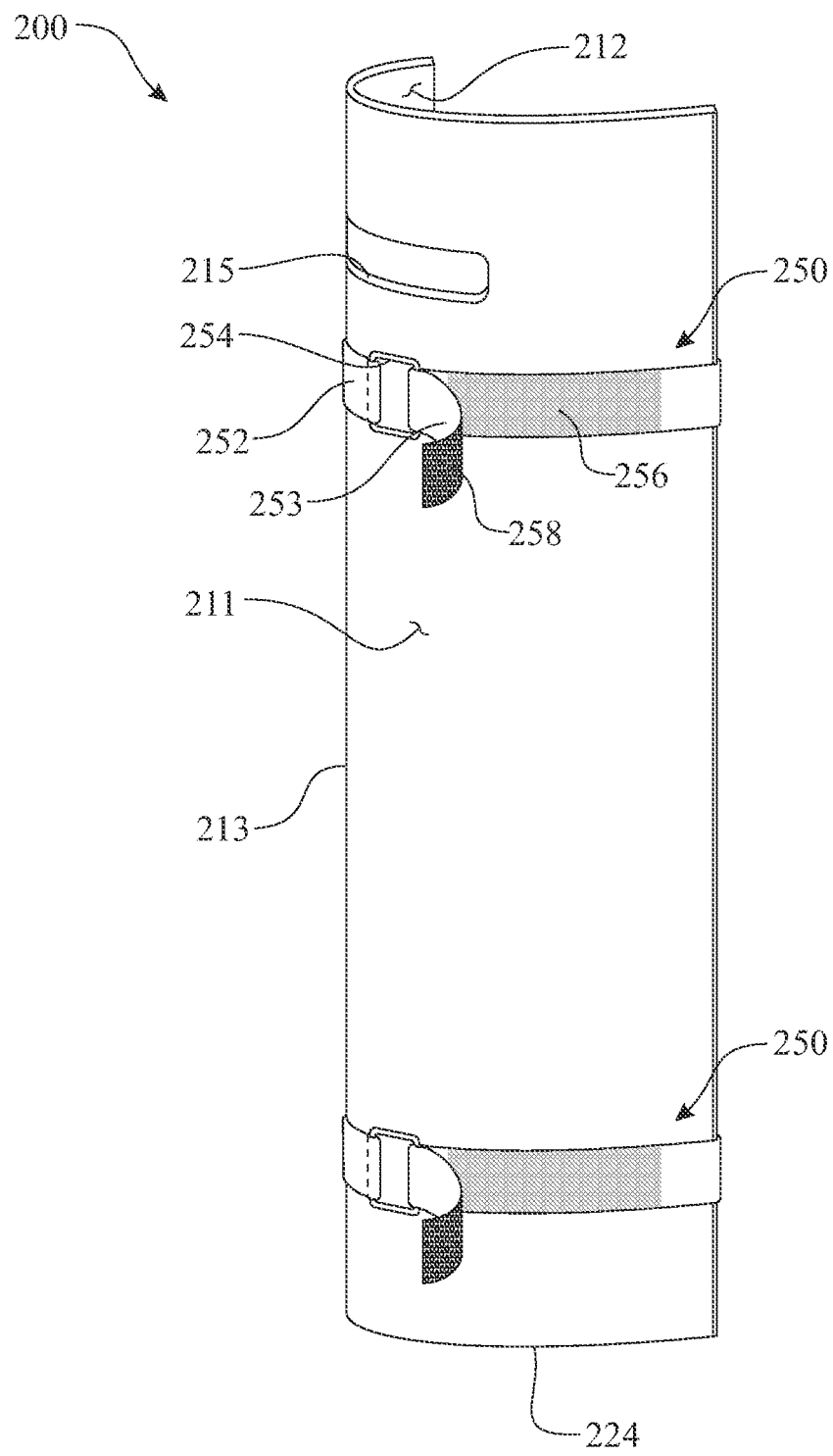
FIG. 8 presents an isometric side view of the second exemplary portable protection device of FIG. 7, introducing a forming function.

In a second embodiment, the portable protective barrier 10 can be extended in length and/or narrowed and subsequently formed as illustrated in FIGS. 7 and 8. The modified sized and shaped portable protective barrier 10 is referred to as a self supporting protective barrier 200. Like features of the self supporting protective barrier 200 and the portable protective barrier 10 are numbered the same except preceded by the numeral '2'. The self supporting protective barrier 200 is initially fabricated in a manner similar to the portable protective barrier 10 as described above. A handle 215 is preferably formed through the material proximate one or more edges of the self supporting protective barrier 200. The self supporting protective barrier 200 is fabricated of a material having a shape memory. The self supporting protective barrier 200 is formed into a desired arched shape by bending the self supporting protective barrier 200 by bringing two parallel edges towards one another, then retaining the arched shaped by placing one or more shaping straps 250 about the formed self supporting protective barrier 200. The arched shape of the self supporting protective barrier 200 defines an exterior arched surface 211 and an interior arched surface 212. The memory of the material retains the desired arched section 213. The arched shaped along either of the two edges can be used as a supporting edge 216, which will be described in detail in FIGS. 9 and 10.

The shaping strap 250 can be of any form factor. The exemplary shaping strap 250 includes a strap 252 attached to one edge of a strap buckle 254. A first dense hook and loop tape section 256 is disposed upon one side of a section of the strap 252 at a location for engagement with a second dense hook and loop tape section 258 disposed upon the same side of the strap 252 along a strap securing end 253. The user would insert the second dense hook and loop tape section 258 through an aperture formed through the strap buckle 254 and return towards the first dense hook and loop tape section 256. The user would pull the strap 252 taught and engage the second dense hook and loop tape section 258 with the first dense hook and loop tape section 256. The shaping strap 250 is adjustable, enabling variation in the radius of the arched section 213.

As illustrated, it is desirable to utilize a plurality of shaping straps 250 placed in a spatial arrangement along a length of the self supporting protective barrier 200. The user would determine a reasonable quantity of shaping straps 250 to ensure a continuous arch along the length of the self supporting protective barrier 200.

Figure 9:
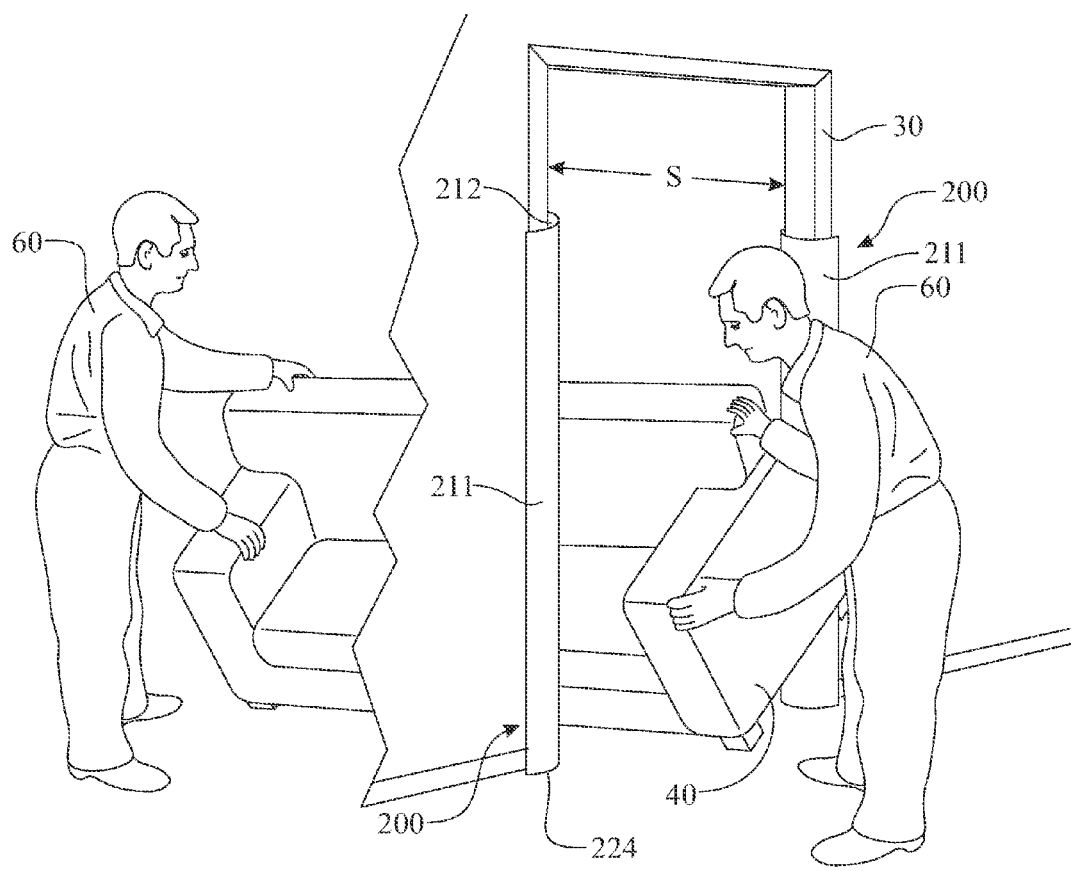
FIG. 9 presents an perspective view of an exemplary application of the second formed portable protection device for facilitating the delivery or moving of an oversized article, wherein the portable protection device is formed and positioned about a doorjamb to prevent damage to a sofa and the doorjamb during passage of the sofa therethrough.
Figure 10:
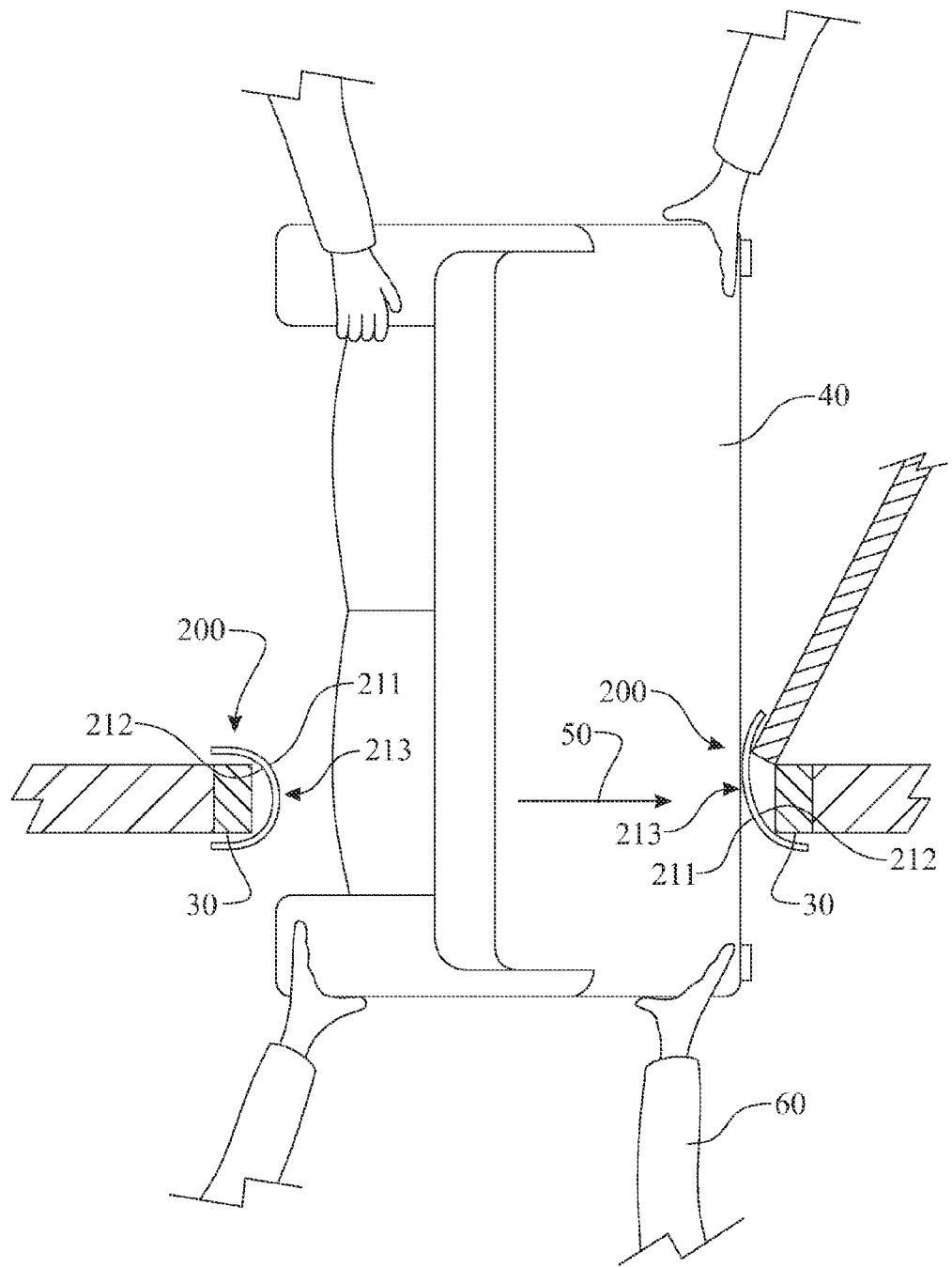
FIG. 10 presents a top view of the exemplary application of the portable protection device, originally presented in FIG. 9, introducing a compression force to aid in the passage of the article through any tight spans.

An exemplary application of the self supporting protective barrier 200 is illustrated in FIGS. 9 and 10. The self supporting protective barrier 200 enables protection of edges of a passageway, a doorway, appliances, and the like, without the requirement of support from the mover. The arched shape aids in protecting the cornered surface of the object as well as providing a supporting edge 216, which is placed upon the ground. The arched section 213 adds rigidity to an otherwise planar and flexible sheet of material. The arched section 213 defines a center of gravity located above a plane formed along the supporting edge 216 by the arched shape. The arched geometry creates a significantly more stable apparatus compared to a planar sheet of material standing on edge. The supporting edge 216 supports the self supporting protective barrier 200 in an upright orientation.

The interior arched surface 212 is placed against the doorway 30 and the supporting edge 216 is set upon the floor. The arch may be adjusted as needed. One exemplary application is when the self supporting protective barrier 200 is placed about a door as illustrated in FIG. 10.

It would be preferred to place one self supporting protective barrier 200 along each edge of the opening or doorway 30 as illustrated in FIGS. 9 and 10. The workers 60 would lightly compress 50 the furniture 40 (or other object being moved) against either of the self supporting protective barriers 200. The slight compression retains the self supporting protective barrier 200 in position. The self supporting protective barrier 200 protects both the doorway 30 and the furniture 40 from damage.

The lower edge 224 is used to support the self supporting protective barrier 200 during use. The lower edge 224 can be shaped to tilt an upper edge of the self supporting protective barrier 200 towards a radial center of the arch of the self supporting protective barrier 200 as illustrated in FIG. 7. The lower edge 224 can include a lower edge peak segment 234 proximate a center thereof, with a lower edge draft segment 235 extending between the lower edge peak segment 234 to each side edge 226, 228. The lower edge peak segment 234 would define a farthest distance from a center point of the self supporting protective barrier 200. The lower edge draft segment 235 provides a linear or curved edge extending between the lower edge peak segment 234 and each side edge 226, 228, wherein the transition between the lower edge peak segment 234 and each edge 226, 228 is at a distance from the center point of the self supporting protective barrier 200 is shorter than the distance between the lower edge peak segment 234 and the center point. The lower edge peak segment 234 and lower edge draft segment 235 can be fabricated of two or more linear sections, a continuous arched section, or any combination thereof.

An upper edge 222 is provided at an opposite end of the self supporting protective barrier 200. The upper edge 222 can be linear as illustrated in the portable, protective device 10, include a shape mirroring the lower edge 224, or a shape contouring with the lower edge 224. In the mirrored configuration, the lower edge 224 includes an upper edge peak segment 232 proximate a center thereof, with an upper edge draft segment 233 extending between the upper edge peak segment 232 to each side edge 226, 228. This enables the user to use either the upper edge 222 or the lower edge 224 as the supporting edge. In the contouring configuration, the upper edge 222 is shaped having an alternate upper edge 223. The alternate upper edge 223 maximizes the utilization of the material, wherein the alternate upper edge 223 is formed by cutting the material to form the lower edge 224 of an adjacent panel. When an arched section 213 is formed into the self supporting protective barrier 200, the lower edge peak segment 234 would be located centrally along the arched section 213. This causes the self supporting protective barrier 200 to lean rearward when placed upon the supporting edge.

The self supporting protective barrier 200 can be stored in either an arched configuration, whereby the self supporting protective barrier 200 is retained by shaping straps 250 or in a planar configuration, where the self supporting protective barrier 200 would be supported by a planar surface, such as a floor, a wall, a board, and the like.

It will be appreciated that although the exemplary embodiment of the present invention is directed towards the use of the portable, protective barrier 10 for moving furniture 40, the portable protective barrier 10 can also be used in a number of different applications such as protecting tile floors, tabletops, or countertops from damage due to items that are inadvertently dropped on such surfaces such as tools, buckets, hammers, or other objects that may fall on a floor, tabletop or countertop and chip, break, crack, scratch or damage the surfaces thereof.

For example, the portable, protective barrier 10 may be used as a protective barrier on a countertop or tabletop and the non-skid texture prevents the portable, protective barrier 10 from sliding off the table or counter.

Figure 11:
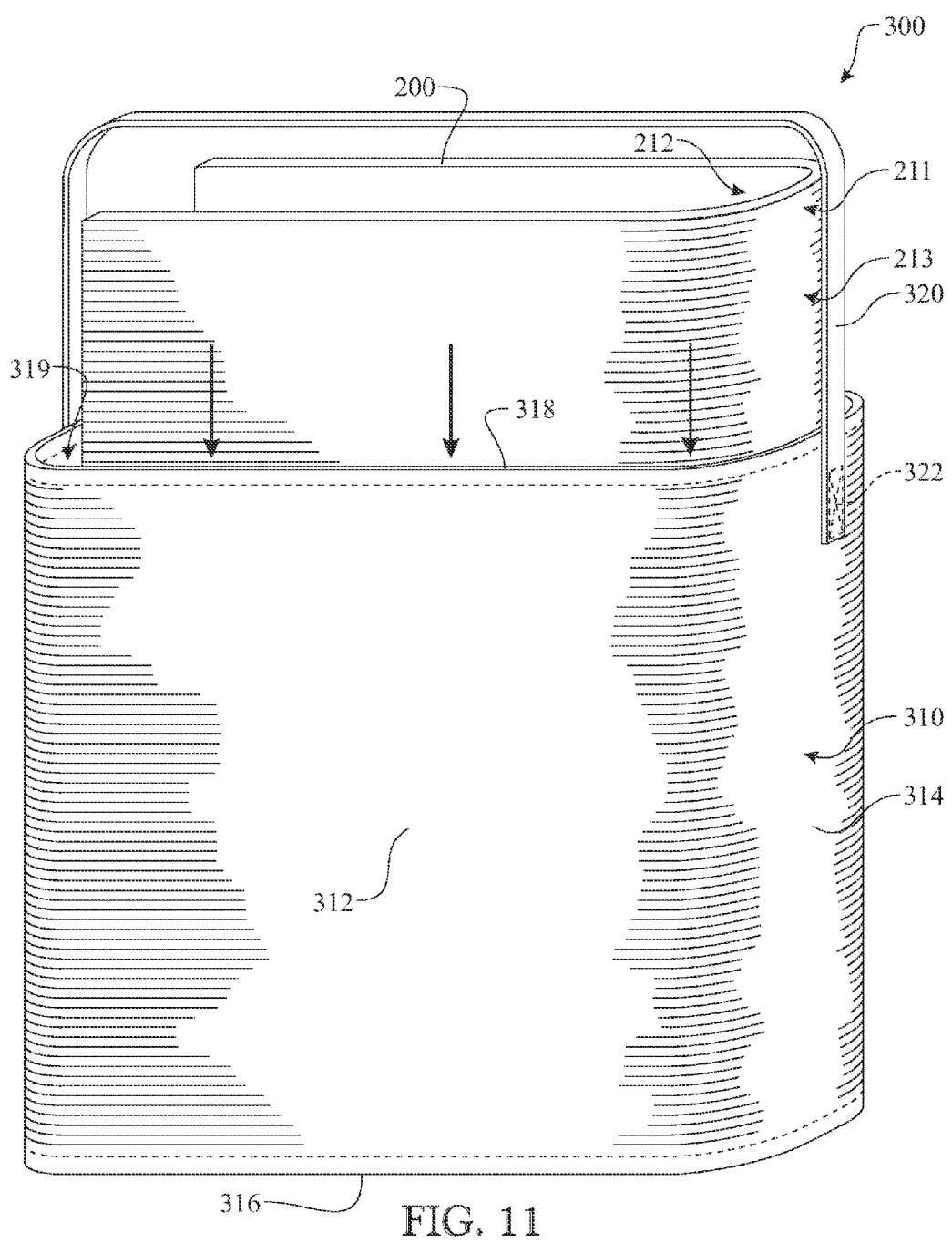
FIG. 11 presents an isometric side view of the portable protection device being inserted into a first exemplary arch-forming carrier, wherein the arch-forming carrier is designed having an arch forming panel located perpendicular to an opening of the arch-forming carrier.
Figure 12:
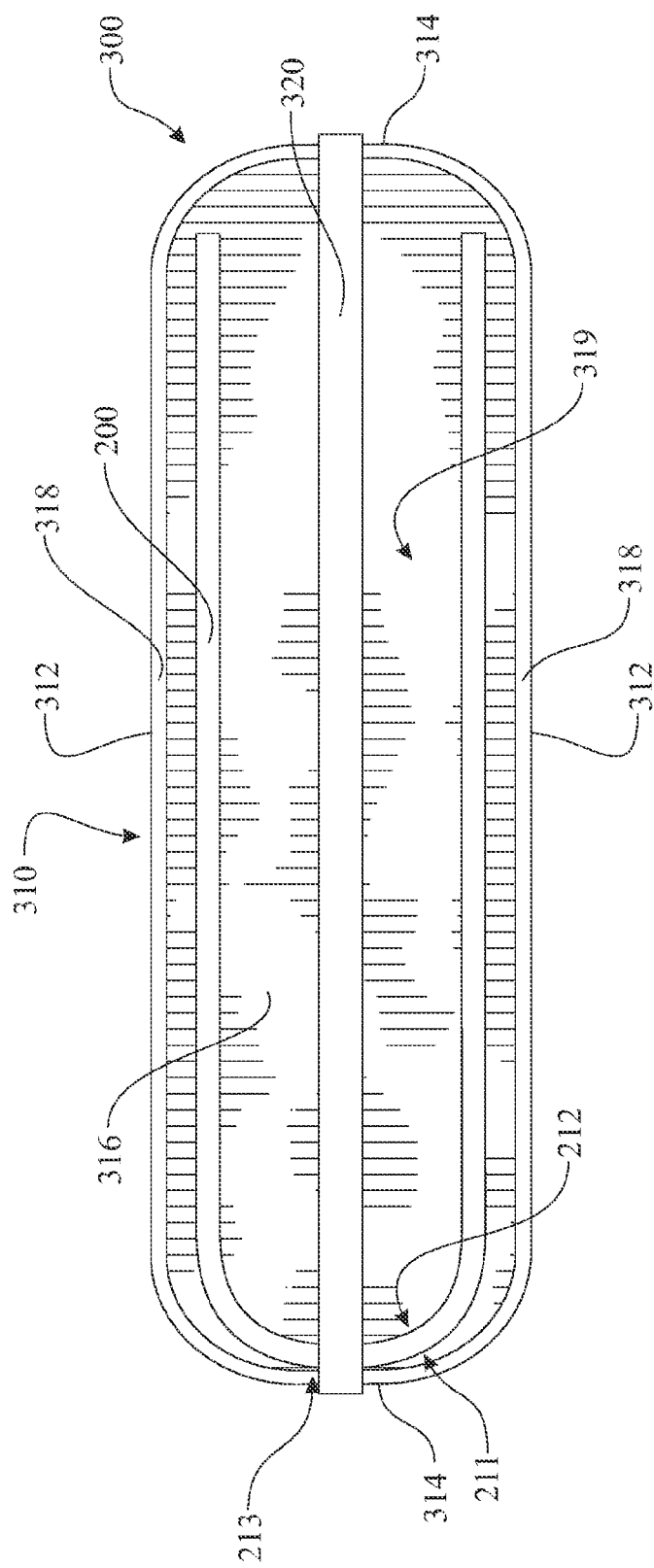
FIG. 12 presents a top view of the portable protection device placed within the first exemplary arch-forming carrier as originally introduced in FIG. 11.

The above embodiments employ straps 250 for retaining the self supporting protective barrier 200 in an arched formation while the material adjusts to retain the arched section 213. In an alternative embodiment, the self supporting protective barrier 200 can be shaped by inserting the self supporting protective barrier 200 into an exemplary arch forming barrier carrier 300 as illustrated in FIGS. 11 and 12. The self supporting protective barrier 200 would become shaped by stowing the self supporting protective barrier 200 within the arch forming barrier carrier 300 over a sufficient period of time enabling the material of the self supporting protective barrier 200 to adapt to the arched shape by forming the arched section 213 as defined by the arch forming barrier carrier 300. It is understood that the arch forming barrier carrier 300 is exemplary and the concept can be accomplished using a arch forming barrier carrier 300 of any suitable design. The arch forming barrier carrier 300 is fabricated having a arch forming barrier carrier container body 310 formed in a continuous tubular shape. The arch forming barrier carrier container body 310 is attached to a peripheral edge of a arch forming barrier carrier container bottom panel 316, wherein the arch forming barrier carrier container bottom panel 316 defined a vertical shape of the arch forming barrier carrier container body 310. The cross section shape of the arch forming barrier carrier container body 310 preferably defines a pair of planar retention wall segment 312 located opposite one another and a pair of arch forming container wall segment 314 located opposite one another. Each arch forming barrier carrier container body 310 extends between like ends of the pair of planar retention wall segment 312 and, similarly, each planar retention wall segment 312 extends between like ends of the pair of arch forming barrier carrier container body 310. A carrier container side panel upper opening edge 318 circumscribes an end of the arch forming barrier carrier container body 310 opposite the arch forming barrier carrier container bottom panel 316. The arch forming barrier carrier container body 310 and arch forming barrier carrier container bottom panel 316 collectively define a container interior 319. The first exemplary arch forming barrier carrier 300 is designed having a arch forming container wall segment 314 oriented perpendicular to a carrier container side panel upper opening edge 318, wherein the arch forming container wall segment 314 defines the arched section 213 of the self supporting protective barrier 200. When the self supporting protective barrier 200 is inserted into the container interior 319, the arched section 213 is formed/positioned proximate one of the arch forming container wall segments 314. The self supporting protective barrier 200 would be manually bent forming the arched section 213 to fit within the container interior 319 and slid therein. The self supporting protective barrier 200 would be stowed within the container interior 319 for a period of time enabling the material of the self supporting protective barrier 200 to adapt to the arched shape as illustrated.

The arch forming barrier carrier 300 can optionally include a arch forming barrier carrier handle 320 to aid in transporting the device. The arch forming barrier carrier handle 320 can be attached to the arch forming barrier carrier container body 310 using any suitable carrier handle attachment mechanism 322. The exemplary embodiment permanently fastens the arch forming barrier carrier handle 320 to the arch forming barrier carrier container body 310 using stitching. It is understood that the arch forming barrier carrier handle 320 can be attached to the arch forming barrier carrier container body 310 using any suitable permanent or detachable fastening mechanism, including rivets, snaps, dense hook and loop tape, and the like.

The concept can be adapted to carriers having alternative shapes and/or arch forming features.

Figure 13:
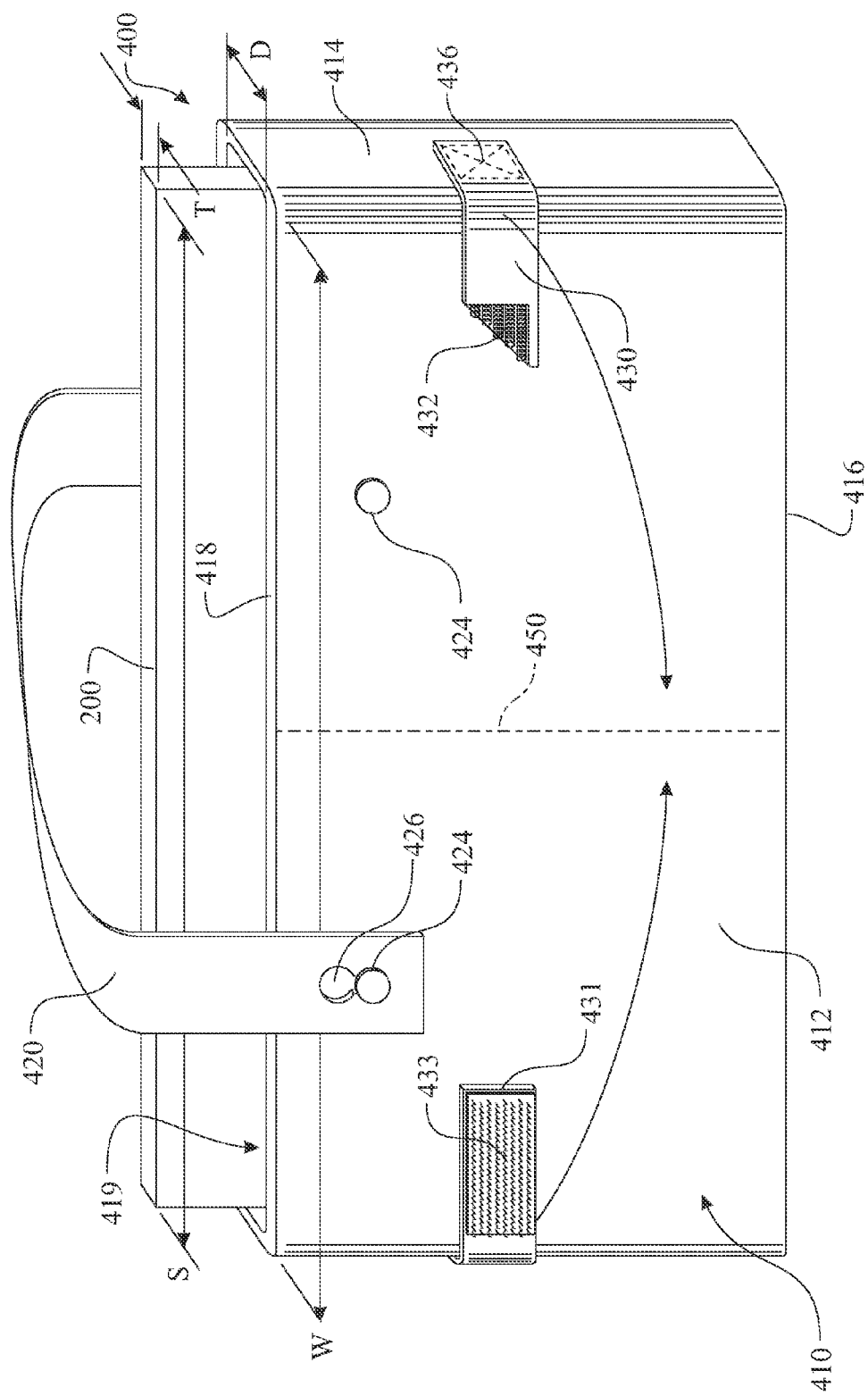
FIG. 13 presents an isometric side view of the portable protection device being seated within a second exemplary arch-forming carrier, wherein the arch-forming carrier is designed to be bent forming an arched shape after receiving the portable protection device.
Figure 14:
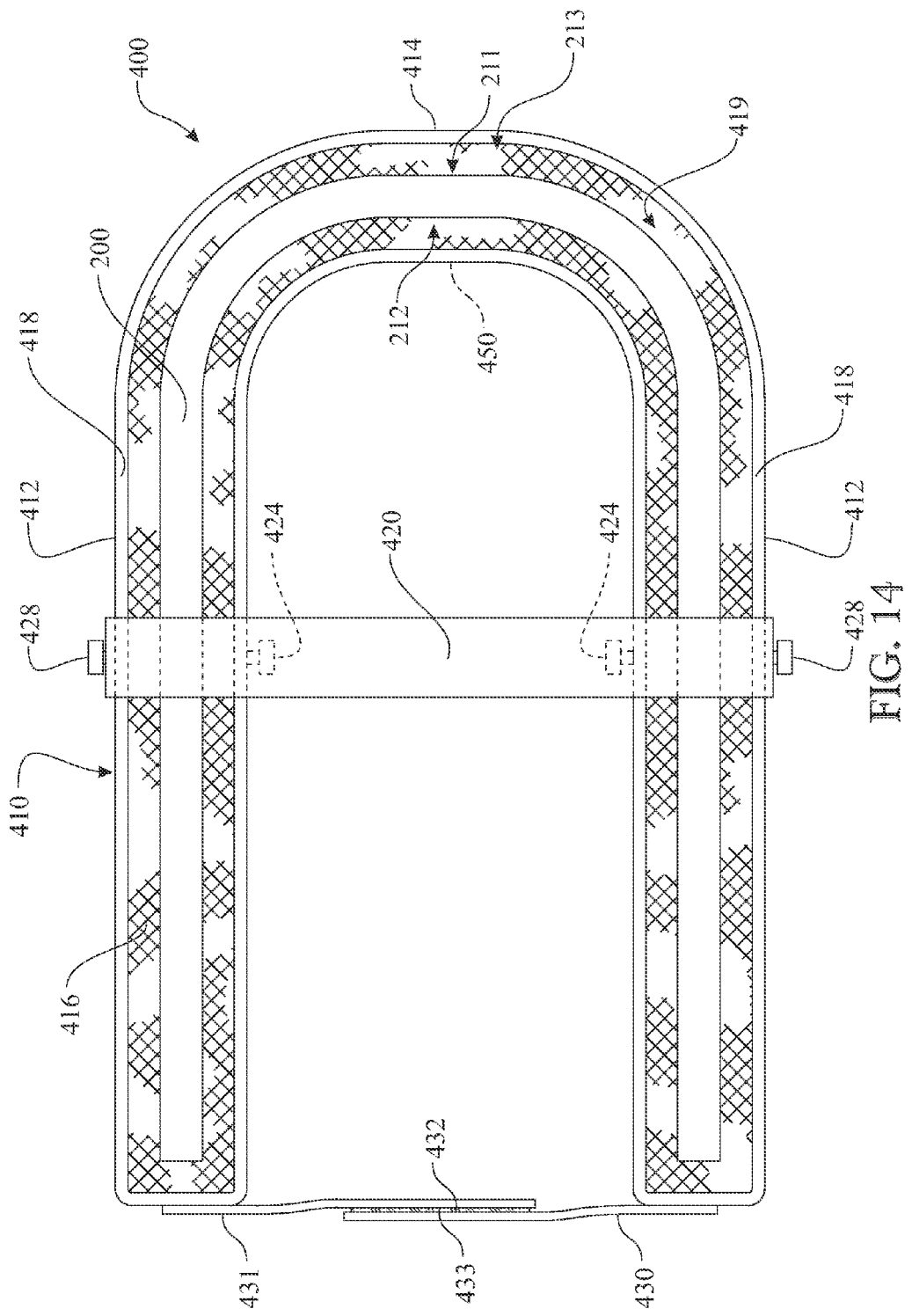
FIG. 14 presents a top view of the portable protection device placed within the second exemplary arch-forming carrier as originally introduced in FIG. 13, wherein the arch-forming carrier has been subsequently bent forming an arched shape within the portable protection device.

In a second alternative embodiment, the self supporting protective barrier 200 can be shaped by inserting the self supporting protective barrier 200 into an exemplary arch forming barrier carrier 400 as illustrated in FIGS. 13 and 14. The arch forming barrier carrier 400 comprises a number of features that are similar to those of the arch forming barrier carrier 300. Like features of the arch forming barrier carrier 400 and the arch forming barrier carrier 300 are numbered the same except preceded by the numeral '4'.

The self supporting protective barrier 200 would become shaped by stowing the self supporting protective barrier 200 within a curved configuration of the arch forming barrier carrier 400 over a sufficient period of time enabling the material of the self supporting protective barrier 200 to adapt to the arched shape defined by the shaped arch forming barrier carrier 400, creating the arched section 213. It is understood that the arch forming barrier carrier 400 is exemplary and the concept can be accomplished using a arch forming barrier carrier 400 of any suitable design. The arch forming barrier carrier 400 is fabricated having a arch forming barrier carrier container body 410 formed in a continuous tubular shape. The arch forming barrier carrier container body 410 is attached to a peripheral edge of a arch forming barrier carrier container bottom panel 416, wherein the arch forming barrier carrier container bottom panel 416 defined a vertical shape of the arch forming barrier carrier container body 410. The cross section shape of the arch forming barrier carrier container body 410 preferably defines a pair of planar retention wall segment 412 located opposite one another and a pair of arch forming container wall segment 414 located opposite one another. Each arch forming barrier carrier container body 410 extends between like ends of the pair of planar retention wall segment 412 and, similarly, each planar retention wall segment 412 extends between like ends of the pair of arch forming barrier carrier container body 410 collectively forming a container replicating a width and thickness of the self supporting protective barrier 200. A carrier container side panel upper opening edge 418 circumscribes an end of the arch forming barrier carrier container body 410 opposite the arch forming barrier carrier container bottom panel 416. The arch forming barrier carrier container body 410 and arch forming barrier carrier container bottom panel 416 collectively define a container interior 419. The container interior 419 is shaped having a depth D, which is approximately the same as a thickness T of the self supporting protective barrier 200 and a width W, which is approximately the same as or longer than a span S of the self supporting protective barrier 200. In a arch forming barrier carrier 400 where the container interior 419 is shaped having a width W that is longer than a span S of the self supporting protective barrier 200, the self supporting protective barrier 200 can be positioned to modify the location of the arched section 213 along the span S thereof.

A first arch forming strap 430 and mating second arch forming strap 431 are attached to the arch forming barrier carrier container body 410 at a location proximate each respective arch forming container wall segment 414. The arch forming straps 430, 431 are attached to the arch forming barrier carrier container body 410 by strap attachment stitching 436 or any other suitable attachment mechanism. The first arch forming strap 430 and second arch forming strap 431 comprise joining elements 432, 433 enabling attachment of the first arch forming strap 430 and second arch forming strap 431 to one another. The joining elements 432, 433 can be any suitable joining elements including a dense hook and loop tape fastener, snaps, a button and buttonhole, a frog closure, a buckle and fastener, and the like. In the exemplary embodiment, the first arch forming strap engaging element 432 is a dense loop segment of a dense hook and loop tape fastener and the second arch forming strap engaging element 433 is a hook segment of the dense hook and loop tape fastener. It is well understood that the sections of the dense hook and loop tape fastener can be exchanged, where the first arch forming strap engaging element 432 is a dense hook segment of a dense hook and loop tape fastener and the second arch forming strap engaging element 433 is a loop segment of the dense hook and loop tape fastener. In an alternative embodiment (not shown), the strap segments 430, 431 can be a single assembly comprising a length-adjusting element.

A arch forming barrier carrier handle 420 can be assembled to the arch forming barrier carrier container body 410 using any suitable assembly methods. The arch forming barrier carrier handle 420 can be permanently affixed to the arch forming barrier carrier container body 410 using stitching or removably attached, such as in the exemplary embodiment illustrated in FIGS. 13 and 14. The exemplary embodiment utilizes a handle fastening mating receiver 426 formed proximate each end of the arch forming barrier carrier handle 420, which is removably attached to the arch forming barrier carrier container body 410 by a handle fastening hardware 424, 428. The exemplary embodiment locates a pair of handle fastening hardware 424 along a first planar retention wall segment 412 and a pair of handle fastening hardware 428 along a second, opposite planar retention wall segment 412 as illustrated in FIG. 14. Each of the pair of handle fastening hardware 424 and similarly pair of handle fastening hardware 428 are preferably located equidistant from a carrier body centerline 450. This enables the arch forming barrier carrier handle 420 to be assembled to the arch forming barrier carrier container body 410 in a manner suitable for supporting the arch forming barrier carrier 400 when configured in a planar configuration (FIG. 13) and in a manner suitable for supporting the arch forming barrier carrier 400 when configured in an arch-forming configuration (FIG. 14).

In use, the self supporting protective barrier 200 is retained in a planar configuration and inserted into the container interior 419. The self supporting protective barrier 200 is located within the container interior 419 aligning the carrier body centerline 450 of the arch forming barrier carrier container body 410 with the transverse section of the self supporting protective barrier 200 where the user desires to locate the arched section 213. The arch forming barrier carrier container body 410 is arched and retained in the arched shape by joining the first arch forming strap 430 and second arch forming strap 431 with one another using the first arch forming strap engaging element 432 and second arch forming strap engaging element 433 as illustrated in FIG. 14. The first arch forming strap engaging element 432 and second arch forming strap engaging element 433 would be joined to one another using the associated joining techniques based upon the form factor selected for the design of the arch forming barrier carrier 400. The user can reposition the arch forming barrier carrier handle 420 by securing each end to a respective handle fastening hardware 428. It is noted that the arch forming barrier carrier handle 420 can be employed to aid in retaining the desired "U" shape of the arch forming barrier carrier container body 410 focusing the location of the arched section 213. The self supporting protective barrier 200 would be stowed within the bent arch forming barrier carrier 400 for a period of time enabling the material of the self supporting protective barrier 200 to adapt to the arched shape forming the arched section 213 as illustrated.

In the previous embodiments 300, 400, the arched section 213 is formed by locating the interior arched surface 212 against the interior surface of the arch forming barrier carrier container body 310, 410. The self supporting protective barrier 200 is inserted in a direction that is parallel to the axis of rotation of the arched section 213.

Figure 15:
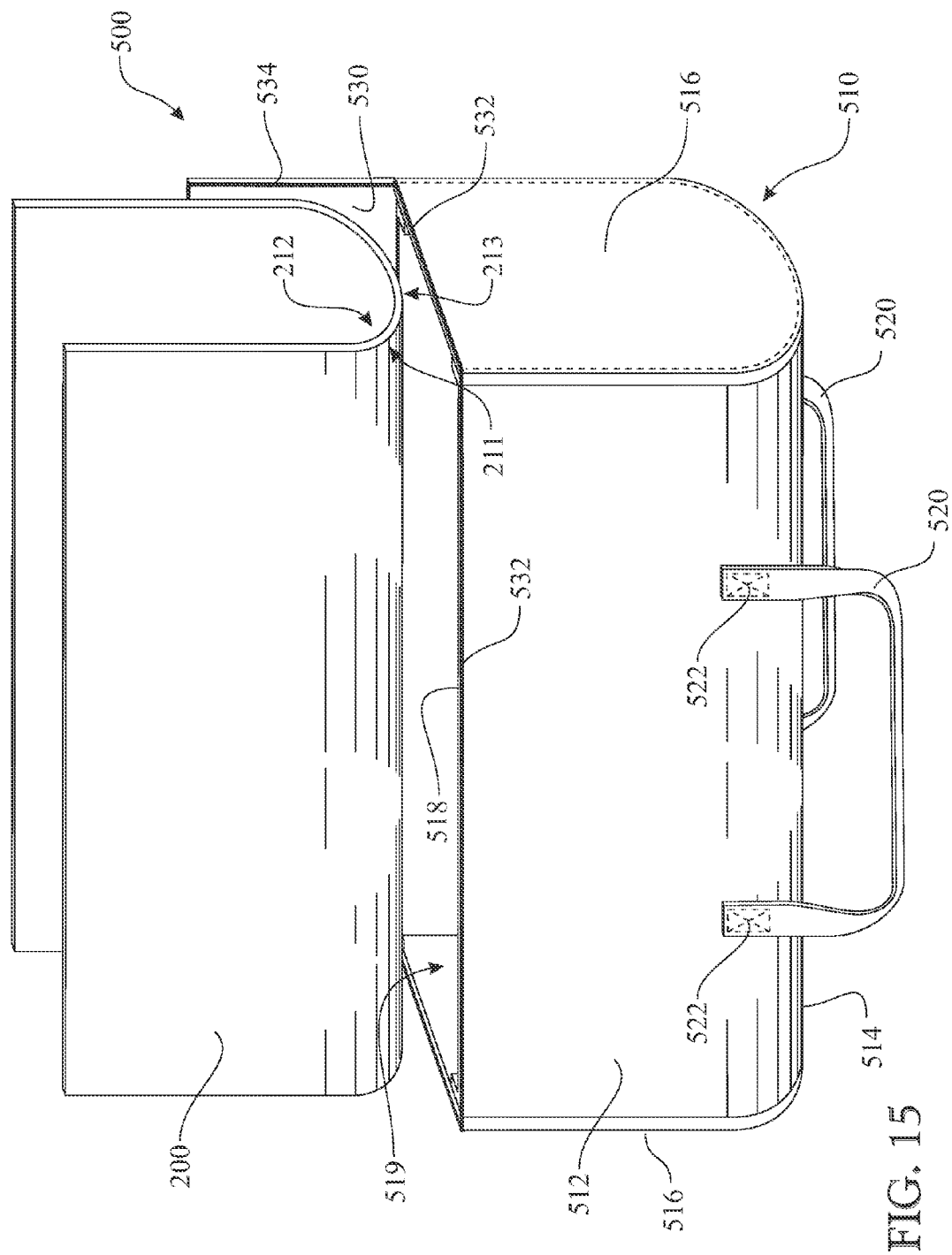
FIG. 15 presents an isometric side view of the portable protection device being inserted into a third exemplary arch-forming carrier, wherein the third exemplary arch-forming carrier is designed having an arch forming panel located parallel and opposite to an opening of the arch-forming carrier.
Figure 16:
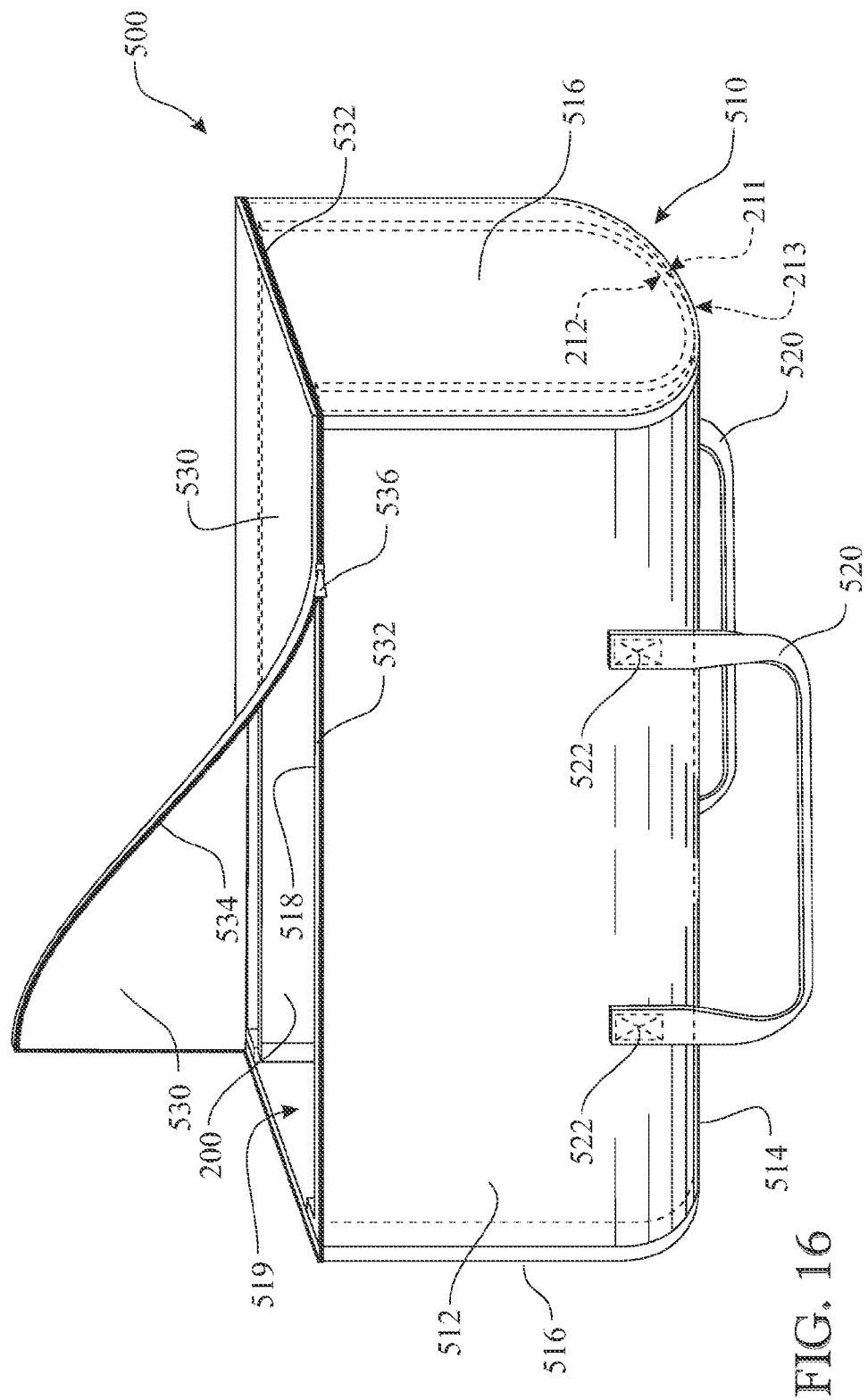
FIG. 16 presents an isometric side view of the portable protection device seated within the third exemplary arch-forming carrier, wherein the third exemplary arch-forming carrier is shown having a closure being partially closed.

In yet another alternative embodiment, the arched section 213 is formed by placing the interior arched surface 212 against an interior surface of a base or top section of a arch forming barrier carrier container body 510 of a arch forming barrier carrier 500 as illustrated in FIGS. 15 and 16. In this configuration, the self supporting protective barrier 200 is inserted in a direction that is perpendicular to the axis of rotation of the arched section 213. The arch forming barrier carrier 500 comprises a number of features that are similar to those of the arch forming barrier carrier 300, 400. Like features of the arch forming barrier carrier 500 and the arch forming barrier carrier 300, 400 are numbered the same except preceded by the numeral '5'.

The arch forming barrier carrier 500 includes at least one barrier carrier handle 520 attached to a arch forming barrier carrier container body 510. The arch forming barrier carrier container body 510 is preferably manufactured by assembly a central panel to a pair of arch forming barrier carrier container end panels 516. The arch forming barrier carrier container end panels 516 shape the central panel into a pair of planar retention wall segments 512 and a arch forming container wall segment 514 located therebetween. Collectively, the central panel 512, 514 and the pair of arch forming barrier carrier container end panels 516 define a container interior 519. Each arch forming barrier carrier container end panel 516 is shaped having an arched bottom edge, wherein the arched bottom edge defines and shapes the arch forming container wall segment 514. The edges of each arch forming barrier carrier container end panel 516 extending between the arch forming container wall segment 514 and the carrier container side panel upper opening edge 518 are preferably linear (straight). A carrier enclosing flap 530 can be flexibly attached to any suitable length or segment of a carrier container side panel upper opening edge 518 of the arch forming barrier carrier container body 510. In the exemplary embodiment, one edge of the carrier enclosing flap 530 is integral with the carrier container side panel upper opening edge 518 of one of the planar retention wall segments 512. The carrier enclosing flap 530 is sized and shaped to enclose the opening defined by the carrier container side panel upper opening edge 518. A closure is attached about free edges of a peripheral edge of the carrier enclosing flap 530 and the free edges of the carrier container side panel upper opening edge 518. The closure can be any suitable closure form factor. The exemplary closure is a zipper comprising a container zipper portion 532 attached to the free edges of the carrier container side panel upper opening edge 518 and a flap zipper portion 534 attached to the free edges of the peripheral edge of the carrier enclosing flap 530. The zipper is operated by a zipper pull tab 536 (FIG. 6). Although the exemplary embodiment is a zipper, it is understood that any suitable closure mechanism can be integrated into the design of the arch forming barrier carrier 500. Alternatives to the zipper include sections of dense hook and loop tape, buttons, ties (ribbon, laces, rope, and the like), snaps, roping and eyelets, magnetic and magnetically charged elements, and the like. The closure retains the carrier enclosing flap 530 in a closed configuration. When the carrier enclosing flap 530 is secured in a closed configuration by the closure, the edges of the carrier enclosing flap 530 along the carrier container side panel upper opening edge 518 of the planar retention wall segment 512 retains the linear shape of the planar retention wall segment 512.

At least one barrier carrier handle 520 is assembled to the arch forming barrier carrier container body 510 using any suitable permanent or removable attachment mechanism. In the exemplary embodiment, a pair of barrier carrier handles 520 are assembled to the arch forming barrier carrier container body 510 using stitching for the carrier handle attachment mechanism 522.

In use, a arched section 213 is manually formed in the self supporting protective barrier 200. The self supporting protective barrier 200 is oriented initially inserting the arched section 213 into the container interior 519. The self supporting protective barrier 200 is inserted into the container interior 519 seating the arched section of the interior arched surface 212 against an interior surface of the arch forming container wall segment 514. The planar portions of the self supporting protective barrier 200 reside against each of the respective planar retention wall segments 512. The carrier enclosing flap 530 is folded into a closed configuration. The elements of the closure are engaged with one another to retain the carrier enclosing flap 530 in position about the carrier container side panel upper opening edge 518, entrapping the self supporting protective barrier 200 within the container interior 519.

The arch forming barrier carrier container body 310, 410, 510 can be fabricated of any suitable material. In a first consideration, the arch forming barrier carrier container body 310, 410, 510 would be manufactured of a soft, pliant material, such as fabric, vinyl, canvas, paper products, and the like. In a second consideration, the arch forming barrier carrier container body 310, 410, 510 would be manufactured of a soft, semi-rigid material, such as flexible plastic, rubber, silicone, and the like. In a third consideration, the arch forming barrier carrier container body 310, 410, 510 would be manufactured of a rigid material, such as rigid plastic, rigid rubber, wood, metal, composite materials, and the like. It is also understood that a combination of materials can be used to form the arch forming barrier carrier container body 310, 410, 510. A more rigid material can be inserted into the container interior 319, 419, 519, laminated to the material of the arch forming barrier carrier container body 310, 410, 510, sandwiched within two layers of material used to fabricate the arch forming barrier carrier container body 310, 410, 510, and the like to increase the rigidity of the arch forming barrier carrier container body 310, 410, 510. Alternatively, a softer material can be inserted into the container interior 319, 419, 519, laminated to the material of the arch forming barrier carrier container body 310, 410, 510, and the like to provide a softer surface to the material of the arch forming barrier carrier container body 310, 410, 510.

Although the arch forming barrier carrier container body 310, 510 are illustrated comprising an arched segment, it is understood that the arch forming barrier carrier container body 310, 510 can be shaped exclusive of the arched segment. The arch forming barrier carrier container body 310, 510 can be designed to enable features of the bent portable protection device to be placed against an interior surface of the arch forming barrier carrier container body 310, 510 to retain the bent portable protection device 200 in the bent shape. The arch forming barrier carrier container body 310, 510 can be shaped having a rectangular shape, a triangular shape, an elliptical shape, a pentagonal shape, a hexagonal shape, an octagonal shape, and the like. The arch forming barrier carrier container body 310, 510 can be symmetrically or asymmetrically shaped.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

I claim:

1. A method of facilitating movement of an object through a space provided between two barriers, said method comprising the steps of:
   obtaining a portable protective barrier comprising a planar board fabricated of a plastic material having a shape memory, said planar board having a peripheral edge defining two opposite surfaces;
   obtaining a carrier, said carrier comprising:
     a carrier body comprising four side container panel segments and an end panel segment defining a container interior and a container opening formed about an open end of said four side container panel segments
   placing said portable protective barrier into said container interior;
   bending said portable protective barrier to form an arched segment, wherein the arched segment is retained in position by at least one of a shape and a feature of said carrier body, wherein said arched segment redefines said portable protective barrier as a bent portable protective barrier, wherein said bent portable protective barrier comprises an exterior surface being on a convex arched surface and defining an interior surface being on a concave arched surface;
   retaining said portable protective barrier within said container interior of said carrier body over a period of time enabling said shape memory to retain said arched section in an arched shape;

removing said portable protective barrier from said carrier body;

supporting said portable protective barrier by placing a lower edge of said portable protective barrier upon a ground surface;

using a resulting shape of said arched section to support said bent portable protective barrier in position by placing a lower edge of said bent portable protective barrier against a floor and said direct engagement between said interior surface and said corner of one of said two barriers to retain said bent portable protective barrier in position; and transporting at least one large object compressing one side of said object against said placed portable protective barrier to facilitate movement of the object through said space.

2. The method of facilitating movement of an object through a space provided between two barriers as recited in claim 1, said method comprising the additional step of:

positioning said interior surface of said portable protective barrier against one of said two barriers and supporting said portable protective barrier by placing said interior surface in contact with each of two corners of said one of said two barriers, wherein said arched section provides flexure when a force is applied to said convex arched surface.

3. The method of facilitating movement of an object through a space provided between two barriers as recited in claim 1, wherein said step of bending said portable protective barrier to form said arched segment is accomplished prior to said step of placing said portable protective barrier into said container interior.

4. The method of facilitating movement of an object through a space provided between two barriers as recited in claim 1, wherein said step of bending said portable protective barrier to form said arched segment is accomplished after said step of placing said portable protective barrier into said container interior by bending said carrier body and securing said carrier body in said bent configuration.

5. The method of facilitating movement of an object through a space provided between two barriers as recited in claim 1, said carrier body further comprising a carrier enclosing flap and a closure, the method further comprising a step of joining a peripheral edge of a carrier enclosing flap to a respective peripheral edge of said container opening, wherein said carrier enclosing flap retains a shape of said container opening.

6. The method of facilitating movement of an object through a space provided between two barriers as recited in claim 1, said method comprising the additional step of:

providing a shape memory by fabricating said portable protective barrier of any one of plastic, recyclable plastic, polyvinyl chloride, vinyl, thermoplastic, thermosetting plastic, polycarbonate, polypropylene, polyurethane, and any combination thereof.

7. The method of facilitating movement of an object through a space provided between two barriers as recited in claim 1, said method comprising the additional step of:

providing a low friction interface between the portable protective barrier and the at least one large item by providing said exterior surface of said portable protective barrier with a smooth, slippery texture.

8. A method of facilitating movement of an object through a space provided between two barriers, said method comprising the steps of:

obtaining a portable protective barrier comprising a planar board fabricated of a plastic material having a shape memory, said planar board having a peripheral edge defining two opposite surfaces;

obtaining a carrier, said carrier comprising:

a carrier body comprising four side container panel segments and an end panel segment defining a container interior and a container opening formed about an open end of said four side container panel segments;

bending said portable protective barrier to form an arched segment, wherein the arched segment is retained in position by at least one of a shape and a feature of said carrier body, wherein said arched segment redefines said portable protective barrier as a bent portable protective barrier, wherein said bent portable protective barrier comprises an exterior surface being on a convex arched surface and defining an interior surface being on a concave arched surface;

inserting said bent portable protective barrier into said container interior;

retaining said portable protective barrier within said container interior of said carrier body over a period of time enabling said shape memory to retain said arched section in an arched shape;

removing said portable protective barrier from said carrier body;

supporting said portable protective barrier by placing a lower edge of said portable protective barrier upon a ground surface;

positioning said interior surface of said portable protective barrier against one of said two barriers, wherein said interior surface is positioned contacting two corners of said one of said two barriers and said arched section provides flexure when a force is applied to said convex arched surface;

using a resulting shape of said arched section to support said bent portable protective barrier in position by placing a lower edge of said bent portable protective barrier against a floor and said direct engagement between said interior surface and said corner of one of said two barriers to retain said bent portable protective barrier in position; and transporting at least one large object compressing one side of said object against said placed portable protective barrier to facilitate movement of the object through said space.

9. The method of facilitating movement of an object through a space provided between two barriers as recited in claim 8, said method comprising the additional step of:

positioning said interior surface of said portable protective barrier against one of said two barriers and supporting said portable protective barrier by placing said interior surface in contact with each of two corners of said one of said two barriers, wherein said arched section provides flexure when a force is applied to said convex arched surface.

10. The method of facilitating movement of an object through a space provided between two barriers as recited in claim 8, further comprising steps of:

orienting said arched segment parallel to a direction of insertion; and inserting said bent portable protection device features of said bent portable protective barrier against an interior surface of said container body to retain said bent portable protection device in said bent shape.

11. The method of facilitating movement of an object through a space provided between two barriers as recited in claim 8, further comprising steps of:

orienting said arched segment perpendicular to a direction of insertion; and inserting said bent portable protection device features of said bent portable protective barrier against an interior surface of said container body to retain said bent portable protection device in said bent shape.

12. The method of facilitating movement of an object through a space provided between two barriers as recited in claim 8, said carrier body further comprising a carrier enclosing flap and a closure, the method further comprising a step of joining a peripheral edge of a carrier enclosing flap to a respective peripheral edge of said container opening, wherein said carrier enclosing flap retains a shape of said container opening.

13. The method of facilitating movement of an object through a space provided between two barriers as recited in claim 8, said method comprising the additional step of:

providing a shape memory by fabricating said portable protective barrier of any one of plastic, recyclable plastic, polyvinyl chloride, vinyl, thermoplastic, thermosetting plastic, polycarbonate, polypropylene, polyurethane, and any combination thereof.

14. The method of facilitating movement of an object through a space provided between two barriers as recited in claim 8, said method comprising the additional step of:

providing a low friction interface between the portable protective barrier and the at least one large item by providing said exterior surface of said portable protective barrier with a smooth, slippery texture.

15. A method of facilitating movement of an object through a space provided between two barriers, said method comprising the steps of:

obtaining a portable protective barrier comprising a planar board fabricated of a plastic material having a shape memory, said planar board having a peripheral edge comprising an upper edge, a lower edge, a first side edge and a second side edge, said lower edge comprising a centrally located peak segment extending further from a center of the planar board compared to each corner located between said lower edge and each of said first side edge and second side edge, said peripheral edge defining two opposite surfaces;

obtaining a carrier, said carrier comprising:

a carrier body comprising four side container panel segments and an end panel segment defining a container interior and a container opening formed about an open end of said four side container panel segments;

placing said portable protective barrier into said container interior;

bending said portable protective barrier to form an arched segment, wherein the arched segment is retained in position by at least one of a shape and a feature of said carrier body, wherein said arched segment redefines said portable protective barrier as a bent portable protective barrier, wherein said bent portable protective barrier comprises an exterior surface being on a convex arched surface and defining an interior surface being on a concave arched surface;

retaining said portable protective barrier within said container interior of said carrier body over a period of time enabling said shape memory to retain said arched section in an arched shape;

removing said portable protective barrier from said carrier body;

placing said centrally located peak segment into one of a supporting surface and a floor proximate one of said two barriers, wherein said centrally located peak segment causes said portable protective barrier to lean towards said interior surface; and transporting at least one large object through said space by compressing one side of said at least one large object against said placed portable protective barrier to facilitate movement of the object through said space.

16. The method of facilitating movement of an object through a space provided between two barriers as recited in claim 15, said method comprising the additional step of:

positioning said interior surface of said portable protective barrier against one of said two barriers and supporting said portable protective barrier by placing said interior surface in contact with each of two corners of said one of said two barriers, wherein said arched section provides flexure when a force is applied to said convex arched surface.

17. The method of facilitating movement of an object through a space provided between two barriers as recited in claim 15, wherein said step of bending said portable protective barrier to form said arched segment is accomplished prior to said step of placing said portable protective barrier into said container interior.

18. The method of facilitating movement of an object through a space provided between two barriers as recited in claim 15, wherein said step of bending said portable protective barrier to form said arched segment is accomplished after said step of placing said portable protective barrier into said container interior by bending said carrier body and securing said carrier body in said bent configuration.

19. The method of facilitating movement of an object through a space provided between two barriers as recited in claim 15, said carrier body further comprising a carrier enclosing flap and a closure, the method further comprising a step of joining a peripheral edge of a carrier enclosing flap to a respective peripheral edge of said container opening, wherein said carrier enclosing flap retains a shape of said container opening.

20. The method of facilitating movement of an object through a space provided between two barriers as recited in claim 15, said method comprising the additional step of:

providing a shape memory by fabricating said portable protective barrier of any one of plastic, recyclable plastic, polyvinyl chloride, vinyl, thermoplastic, thermosetting plastic, polycarbonate, polypropylene, polyurethane, and any combination thereof.

* * * * *